US008428594B2

(12) United States Patent
Laroia et al.

(10) Patent No.: US 8,428,594 B2
(45) Date of Patent: Apr. 23, 2013

(54) METHODS AND APPARATUS OF IMPROVING INTER-SECTOR AND/OR INTER CELL HANDOFFS IN A MULTI-CARRIER WIRELESS COMMUNICATIONS SYSTEM

(75) Inventors: Rajiv Laroia, San Diego, CA (US); Frank A. Lane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 12/690,543

(22) Filed: Jan. 20, 2010

(65) Prior Publication Data

US 2010/0210266 A1    Aug. 19, 2010

Related U.S. Application Data

(63) Continuation of application No. 11/266,643, filed on Nov. 3, 2005, now Pat. No. 7,720,479, which is a continuation of application No. 10/964,908, filed on Oct. 14, 2004, now Pat. No. 6,993,333.

(60) Provisional application No. 60/511,964, filed on Oct. 16, 2003.

(51) Int. Cl.
*H04W 36/43* (2006.01)
(52) U.S. Cl.
USPC ........ 455/436; 455/226.1; 455/437; 370/210; 370/338; 370/465
(58) Field of Classification Search .................. 455/436
See application file for complete search history.

(56) References Cited

U.S. PATENT DOCUMENTS 3,771,060 A   11/1973   Wycoff
3,794,976 A    2/1974   Mickler
(Continued)

FOREIGN PATENT DOCUMENTS

JP    63048925 A   3/1988
JP    10075481 A   3/1998
(Continued)

OTHER PUBLICATIONS

"SIP: Session Initiation Protocol", IETF Network Working Group, Requrest for Comments: 3261, pp. 1-29 (Jun. 2002).

(Continued)

*Primary Examiner* — Hai Nguyen
(74) *Attorney, Agent, or Firm* — Michelle Gallardo; Nicholas J. Pauley; Jonathan T. Velasco

(57) ABSTRACT

A wireless communications system, e.g., an OFDM system, uses a plurality of carrier frequencies each with an associated frequency band. A base station sector transmitter in the system transmits ordinary signaling, e.g., user data, in its own assigned band. In addition the sector base station transmitter periodically transmits beacon signals into its own frequency band and the frequency bands used by adjacent sector transmitters for their ordinary signaling. Beacon signals, being short duration high power signals with sector transmission power concentrated on one or a few tones, are easily detectable. Each beacon signal may be identified as to the source base station sector transmitter, e.g., based on tone. A mobile node, tuned to a single carrier band, receives a plurality of beacon signals, identifies the sources of the received beacons, compares the received strength of the beacons, and makes handoff decisions, without having to switch carrier band.

24 Claims, 8 Drawing Sheets

U.S. PATENT DOCUMENTS

| | | | |
|---|---|---|---|
| 3,813,654 A | 5/1974 | Clifton et al. | |
| 3,876,951 A | 4/1975 | McLean et al. | |
| 3,968,418 A | 7/1976 | Kain et al. | |
| 4,137,532 A | 1/1979 | Taylor et al. | |
| 4,244,376 A | 1/1981 | Fisher et al. | |
| 4,249,135 A | 2/1981 | Fisher et al. | |
| 4,268,914 A | 5/1981 | Fisher et al. | |
| 4,390,756 A | 6/1983 | Hoffmann et al. | |
| 4,467,316 A | 8/1984 | Musmann et al. | |
| 4,481,671 A | 11/1984 | Matzold et al. | |
| 4,833,701 A | 5/1989 | Comroe et al. | |
| 5,101,501 A | 3/1992 | Gilhousen et al. | |
| 5,121,126 A * | 6/1992 | Clagett | 342/419 |
| 5,200,952 A | 4/1993 | Bernstein et al. | |
| 5,229,992 A | 7/1993 | Jurkevich et al. | |
| 5,239,677 A * | 8/1993 | Jasinski | 455/509 |
| 5,247,516 A | 9/1993 | Bernstein et al. | |
| 5,250,951 A | 10/1993 | Valentine et al. | |
| 5,251,209 A | 10/1993 | Jurkevich et al. | |
| 5,267,261 A | 11/1993 | Blakeney, II et al. | |
| 5,337,054 A | 8/1994 | Ross et al. | |
| 5,491,835 A | 2/1996 | Sasuta et al. | |
| 5,572,528 A | 11/1996 | Shuen | |
| 5,722,070 A * | 2/1998 | Alford | 455/425 |
| 5,796,727 A * | 8/1998 | Harrison et al. | 370/338 |
| 5,818,813 A * | 10/1998 | Saito et al. | 370/208 |
| 5,914,932 A | 6/1999 | Suzuki et al. | |
| 5,991,289 A | 11/1999 | Huang et al. | |
| 6,078,571 A | 6/2000 | Hall | |
| 6,131,459 A * | 10/2000 | Seale et al. | 73/633 |
| 6,144,671 A | 11/2000 | Perinpanathan et al. | |
| 6,147,926 A * | 11/2000 | Park | 365/233.1 |
| 6,161,008 A | 12/2000 | Lee et al. | |
| 6,195,705 B1 | 2/2001 | Leung | |
| 6,256,300 B1 | 7/2001 | Ahmed et al. | |
| 6,308,267 B1 | 10/2001 | Gremmelmajer | |
| 6,339,639 B1 | 1/2002 | Henderson | |
| 6,366,561 B1 | 4/2002 | Bender | |
| 6,377,608 B1 * | 4/2002 | Zyren | 375/132 |
| 6,400,722 B1 | 6/2002 | Chuah et al. | |
| 6,445,922 B1 | 9/2002 | Hiller et al. | |
| 6,446,127 B1 | 9/2002 | Schuster et al. | |
| 6,466,964 B1 | 10/2002 | Leung et al. | |
| 6,473,412 B1 * | 10/2002 | Haartsen | 370/331 |
| 6,489,923 B1 | 12/2002 | Bevan et al. | |
| 6,496,704 B2 | 12/2002 | Yuan et al. | |
| 6,546,249 B1 | 4/2003 | Imai et al. | |
| 6,560,209 B1 | 5/2003 | Alamoute et al. | |
| 6,587,690 B1 | 7/2003 | Di Huo et al. | |
| 6,611,547 B1 | 8/2003 | Rauhala | |
| 6,650,630 B1 * | 11/2003 | Haartsen | 370/345 |
| 6,671,525 B2 * | 12/2003 | Allen et al. | 455/574 |
| 6,708,031 B2 | 3/2004 | Purnadi et al. | |
| 6,711,120 B1 | 3/2004 | Laroia et al. | |
| 6,763,007 B1 | 7/2004 | La Porta et al. | |
| 6,778,130 B1 | 8/2004 | Bevan et al. | |
| 6,781,968 B1 | 8/2004 | Colella et al. | |
| 6,785,256 B2 | 8/2004 | O'Neill | |
| 6,839,361 B2 | 1/2005 | Marin et al. | |
| 6,853,629 B2 | 2/2005 | Alamouti et al. | |
| 6,862,446 B2 | 3/2005 | O'neill et al. | |
| 6,901,256 B2 * | 5/2005 | Mansour | 455/436 |
| 6,907,228 B1 * | 6/2005 | Lohtia et al. | 455/62 |
| 6,917,605 B2 | 7/2005 | Kakemizu et al. | |
| 6,917,814 B2 * | 7/2005 | Becker et al. | 455/506 |
| 6,928,062 B2 | 8/2005 | Krishnan et al. | |
| 6,947,401 B2 | 9/2005 | Malki et al. | |
| 6,947,768 B2 * | 9/2005 | Adachi et al. | 455/560 |
| 6,954,442 B2 | 10/2005 | Tsirtsis et al. | |
| 6,961,368 B2 | 11/2005 | Dent et al. | |
| 6,965,585 B2 * | 11/2005 | Grilli et al. | 370/331 |
| 6,965,816 B2 | 11/2005 | Walker | |
| 6,970,445 B2 | 11/2005 | O'Neill et al. | |
| 6,985,498 B2 * | 1/2006 | Laroia et al. | 370/478 |
| 6,990,324 B2 * | 1/2006 | Laroia et al. | 455/226.1 |
| 6,990,339 B2 | 1/2006 | Turanyi et al. | |
| 6,992,994 B2 | 1/2006 | Das et al. | |
| 6,993,333 B2 * | 1/2006 | Laroia et al. | 455/436 |
| 7,006,465 B2 | 2/2006 | Toshimitsu et al. | |
| 7,020,115 B2 * | 3/2006 | Chillariga et al. | 370/337 |
| 7,024,188 B2 | 4/2006 | Khun-Jush et al. | |
| 7,039,358 B1 | 5/2006 | Shellhammer et al. | |
| 7,047,009 B2 * | 5/2006 | Laroia et al. | 455/437 |
| 7,050,452 B2 * | 5/2006 | Sugar et al. | 370/465 |
| 7,054,348 B2 | 5/2006 | Epstein | |
| 7,057,799 B2 * | 6/2006 | Chu | 359/308 |
| 7,068,640 B2 | 6/2006 | Kakemizu et al. | |
| 7,092,353 B2 * | 8/2006 | Laroia et al. | 370/210 |
| 7,106,781 B2 | 9/2006 | Agee et al. | |
| 7,120,190 B2 * | 10/2006 | Jones | 375/137 |
| 7,123,599 B2 | 10/2006 | Yano et al. | |
| 7,133,354 B2 | 11/2006 | Laroia et al. | |
| 7,151,794 B2 | 12/2006 | Koifmann et al. | |
| 7,161,913 B2 | 1/2007 | Jung | |
| 7,170,873 B1 | 1/2007 | Cisar et al. | |
| 7,193,975 B2 * | 3/2007 | Tsutsumi et al. | 370/254 |
| 7,202,793 B2 | 4/2007 | Grace et al. | |
| 7,221,667 B2 * | 5/2007 | Hori et al. | 370/338 |
| 7,251,459 B2 * | 7/2007 | McFarland et al. | 455/101 |
| 7,280,467 B2 | 10/2007 | Smee et al. | |
| 7,280,829 B2 | 10/2007 | Rudolf | |
| 7,298,785 B2 | 11/2007 | Suzuki | |
| 7,313,123 B2 * | 12/2007 | Haartsen | 370/342 |
| 7,362,829 B2 | 4/2008 | Ojard | |
| 7,363,039 B2 | 4/2008 | Laroia et al. | |
| 7,366,200 B2 | 4/2008 | Laroia et al. | |
| 7,373,149 B2 * | 5/2008 | Chen et al. | 455/437 |
| 7,376,425 B2 * | 5/2008 | Laroia et al. | 455/437 |
| 7,382,757 B2 | 6/2008 | LoGalbo et al. | |
| 7,388,845 B2 * | 6/2008 | Laroia et al. | 370/311 |
| 7,388,851 B2 | 6/2008 | Trossen | |
| 7,403,472 B2 | 7/2008 | Okada et al. | |
| 7,408,907 B2 | 8/2008 | Diener | |
| 7,424,268 B2 | 9/2008 | Diener et al. | |
| 7,433,683 B2 * | 10/2008 | Dharia et al. | 455/422.1 |
| 7,433,697 B2 | 10/2008 | Karaoguz et al. | |
| 7,436,800 B2 | 10/2008 | Toshimitsu et al. | |
| 7,443,988 B2 | 10/2008 | Knapp et al. | |
| 7,453,912 B2 * | 11/2008 | Laroia et al. | 370/526 |
| 7,457,295 B2 | 11/2008 | Saunders et al. | |
| 7,468,971 B2 | 12/2008 | Hashimoto et al. | |
| 7,567,540 B2 * | 7/2009 | Sakoda | 370/338 |
| 7,590,720 B2 * | 9/2009 | Bahl | 709/223 |
| 7,613,160 B2 * | 11/2009 | Kitchin | 370/345 |
| 7,693,216 B1 * | 4/2010 | Katz | 375/239 |
| 7,720,479 B2 * | 5/2010 | Laroia et al. | 455/436 |
| 7,801,091 B2 * | 9/2010 | Chillariga et al. | 370/337 |
| 7,865,150 B2 * | 1/2011 | McFarland et al. | 455/78 |
| 8,040,848 B2 * | 10/2011 | Uemura et al. | 370/329 |
| 2002/0061031 A1 * | 5/2002 | Sugar et al. | 370/466 |
| 2002/0095297 A1 | 7/2002 | Hasegawa | |
| 2002/0110221 A1 | 8/2002 | Norrell et al. | |
| 2002/0122406 A1 * | 9/2002 | Chillariga et al. | 370/347 |
| 2002/0122410 A1 * | 9/2002 | Kulikov et al. | 370/349 |
| 2002/0136226 A1 | 9/2002 | Christoffel et al. | |
| 2002/0169005 A1 | 11/2002 | Hiramatsu et al. | |
| 2003/0002471 A1 | 1/2003 | Crawford et al. | |
| 2003/0002525 A1 * | 1/2003 | Grilli et al. | 370/465 |
| 2003/0038710 A1 * | 2/2003 | Manis et al. | 340/310.01 |
| 2003/0093187 A1 | 5/2003 | Walker | |
| 2003/0114204 A1 * | 6/2003 | Allen et al. | 455/574 |
| 2003/0129982 A1 | 7/2003 | Perini | |
| 2003/0179734 A1 * | 9/2003 | Tsutsumi et al. | 370/338 |
| 2003/0181213 A1 * | 9/2003 | Sugar et al. | 455/454 |
| 2003/0185171 A1 * | 10/2003 | Mullins et al. | 370/329 |
| 2003/0214922 A1 | 11/2003 | Shahrier | |
| 2004/0131007 A1 | 7/2004 | Smee et al. | |
| 2004/0137905 A1 | 7/2004 | Jeong et al. | |
| 2004/0151109 A1 | 8/2004 | Batra et al. | |
| 2004/0174852 A1 * | 9/2004 | Backes et al. | 370/338 |
| 2004/0202132 A1 | 10/2004 | Heinonen et al. | |
| 2004/0233889 A1 * | 11/2004 | Fujita et al. | 370/350 |
| 2005/0013387 A1 * | 1/2005 | Ojard | 375/316 |
| 2005/0058112 A1 * | 3/2005 | Lahey et al. | 370/338 |
| 2005/0085214 A1 * | 4/2005 | Laroia et al. | 455/403 |
| 2005/0085265 A1 * | 4/2005 | Laroia et al. | 455/560 |
| 2005/0124344 A1 * | 6/2005 | Laroia et al. | 455/436 |

| | | | |
|---|---|---|---|
| 2005/0233746 A1* | 10/2005 | Laroia et al. ............. | 455/436 |
| 2005/0255844 A1* | 11/2005 | Sugaya et al. ............ | 455/426.1 |
| 2006/0025136 A1 | 2/2006 | Fujita et al. | |
| 2006/0052108 A1* | 3/2006 | Laroia et al. ............. | 455/436 |
| 2006/0073826 A1* | 4/2006 | Miernik .................... | 455/435.1 |
| 2006/0073836 A1* | 4/2006 | Laroia et al. ............. | 455/450 |
| 2006/0084404 A1* | 4/2006 | Laroia et al. ............. | 455/266 |
| 2006/0153147 A1* | 7/2006 | Chillariga et al. ........ | 370/337 |
| 2006/0218298 A1 | 9/2006 | Knapp et al. | |
| 2006/0233220 A1 | 10/2006 | Coata | |
| 2007/0026107 A1* | 2/2007 | Wang et al. .............. | 426/55 |
| 2007/0038382 A1 | 2/2007 | Keenan | |
| 2007/0076657 A1 | 4/2007 | Woodings et al. | |
| 2007/0116055 A1* | 5/2007 | Atsumi et al. ............ | 370/476 |
| 2007/0264963 A1 | 11/2007 | Srinivasan et al. | |
| 2007/0280185 A1* | 12/2007 | McFarland et al. ....... | 370/338 |
| 2008/0291856 A1* | 11/2008 | Li et al. .................... | 370/311 |
| 2008/0298339 A1 | 12/2008 | Alamouti et al. | |
| 2009/0275330 A1* | 11/2009 | Shaheen et al. .......... | 455/434 |
| 2010/0210266 A1* | 8/2010 | Laroia et al. ............. | 455/436 |

FOREIGN PATENT DOCUMENTS

| | | |
|---|---|---|
| JP | 2000244392 A | 9/2000 |
| JP | 2002118881 A | 4/2002 |
| RU | 2186465 C2 | 7/2002 |
| WO | WO9512297 | 5/1995 |
| WO | WO9847302 | 10/1998 |
| WO | WO02102101 | 12/2002 |
| WO | WO2004019529 | 3/2004 |

OTHER PUBLICATIONS

Bos, L., et al., A Framework for End-to-End Perceived Quality of Service Negotiation, IEFT Internet Draft, draft-bos-mmusic-sdpqos-framework-00.txt, pp. 1-22 (Nov. 2001).
Camarillo, P., et al., Integration of Resource Management and SIP, IEFT Internet Draft, draft-ietf-sip-manyfolks-resource-04.pg, pp. 1-18, (Feb. 25, 2002).
Campbell, Andrew T. et al., "IP Micro-Mobility Protocols", ACM SIGMOBILE Mobile Computer and Communication Review (MC2R), vol. 4, No. 4, pp. 34-54, (Oct. 2001).
Henning Schulzrinne et al., "Application-Layer Mobility Using SIP" 0-7803-7133 IEEE, pp. 29-36 (Jan. 2000).
Ho, "Integration AAA with Mobile IPv4,", Internet Draft, pp. 1-59, (Apr. 2002).
IEFT Network Working Group Request for Comments: 2961, RSVP Refresh Overhead Reduction Extensions, pp. 1-32 (Apr. 2001).
IEFT, Network Working Group, Request for Comments: 2208, Resource Reservation Protocol (RSVP) Ver. 1 Applicability Statement Some Guidelines on Deployment, pp. 1-6 (Sep. 1997).
IEFT, Network Working Group, Request for Comments: 2209, Resource Reservation Protocol (RSVP)—Ver. 1 Message Processing Rules, pp. 1-24 (Sep. 1997).
IEFT, Network Working Group, Request for Comments: 2210, The Use of RSVP with IETF Integrated Services, pp. 1-31 (Sep. 1997).
IETF, Network Working Group, Request for Comments: 2207—RSVP Extension for IPSEC Data Flows, pp. 1-14 (Sep. 1997).
IETF, Network Working Group, Request for Comments: 2205, Resource Reservation Protocol (RSVP)—Ver. 1 Functional Specification pp. 1-105 (Sep. 1997).
IETF, Network Working Group, Request for Comments: 2206, RSVP Management Information Base Using SMIv2, pp. 1-60 (Sep. 1997).
Johnson, D., et al., IEFT Mobile IP Working Group, "Mobility Support IPv6", downloaded from http://www.join.uni-muenster.de pp. 1-158 (Dec. 29, 2004).
Karagiannis, Mobile IP, State of the Art Report, pp. 1-63 (Jul. 1999).
Li, Yalun "Protocol Architecture for Universal Personal Computing" IEEE Journal of Selected Areas in Communications 15(8): 1467-1476(1997).
Marshall, W., et al., Integration of Respource Management and SIP, IETF Internet Draft, draft-ietf-sip-manyfolks-resource-02.txt, pp. 1-28 (Sep. 2001).
Moy, J. Editor "OSPF Ver. 2", Network Working Group, pp. 1-244 (Apr. 1998).
Network Working Group, IPv6 Prefix Delegation Using ICMPv6. pp. 1-33, (Apr. 2004).
Papalio, D., et al., Extending SIP for QoS Support www.coritel.it/publications/IP_download/papalilo-salsano-veltri.pdf, pp. 1-6 (Dec. 8, 2001).
Perkins, C. Editor "IP Mobility Support", Network Group, pp. 17-79 (Oct. 1996).
Perkins, C., Network Working Group "IP Mobility Support for IPv4", Nokia Research Center, Jan. 2002, downloaded from http://www.ietf.org pp. 1-92 (Dec. 29, 2004).
Source Specific Multicast (SSM) Explicit Multicast (Xcast), pp. 1-27 (Copyright 2001 by ETRI).
TIA/EIZ/IS-707A.8 "Data Service Options for Spread Spectrum Systems: Radio Link Protocal Type 2", pp. 1-1:4:2 (Mar. 1999).
Valko, Andras "Cellular IP: A New Approach to Internet Host Mobility" Computer Communcations Review 29(1): 50-65 (Jan. 1999).
Wedlund, Elin et al.., "Mobility Support Using SiP", Proc. Of ACM/IEEE International Conference on Wireless and Mobile Multimedia (WoWMoM '99), Seattle, Washington, (Aug. 1999).
Zhou, S., et al., "A Location Management Scheme for Support Mobility in Wireless IP Networks Using Session Initiation Protocol (SIP)", pp. 1531-2216/01 IEEE, pp. 486-491, (Oct. 2001).
International Search Report PCT/US2004/034305, International Search Authority US, Jun. 15, 2005.
Written Opinion PCT/US2004/034305, Search Authority US, Jun. 15, 2005.
Johnson, D. et al. IETF Mobile IP Working Group, "Mobility Support in IPv6," ; Feb. 26, 2003 Downloaded From http://www.join.uni-muenster.de on Dec. 29, 2004, p. 1-169.
Mankin, A., et al., "Resource ReSerVation Protocol (RSVP) Version 1, Applicability Statement: Some Guidelines on Deployment", IETF, Network Working Group, Request for Comments: 2208, pp. 1-6 (Sep. 1997).
Supplementary European Search Report—EP04795464—Search Authority—The Hague—May 15, 2012.

* cited by examiner

METHODS AND APPARATUS OF IMPROVING INTER-SECTOR AND/OR INTER CELL HANDOFFS IN A MULTI-CARRIER WIRELESS COMMUNICATIONS SYSTEM

RELATED APPLICATION

This application is a continuation of U.S. patent application Ser. No. 11/266,643, filed Nov. 3, 2005 now U.S. Pat. No. 7,720,479, which is continuation of U.S. patent application Ser. No. 10/964,908 filed Oct. 14, 2004 now U.S. Pat. No. 6,993,333, which claims the benefit of U.S. Provisional Patent Application Ser. No. 60/511,964 filed Oct. 16, 2003; all are hereby expressly incorporated by reference.

FIELD OF THE INVENTION

The present invention relates to communications systems and, more particularly, to methods and apparatus for facilitating selection of a network attachment point to be used and/or implementing handoffs.

BACKGROUND

Cells may include one or more sectors. A cell without multiple sectors is a single sector cell, i.e., it includes a single sector. Signals are normally transmitted by a sector transmitter using a carrier frequency and the corresponding bandwidth, e.g., one or more tones surrounding the carrier frequency. Different cells and/or sectors of a cell often use different frequency bands centered around the carrier frequencies used by the sectors or cells. In a frequency reuse system, the carrier frequencies of adjacent cells and/or sectors are often different. To receive signals corresponding to a carrier frequency, a wireless terminal normally has to adjust its receiver, e.g., receiver filters, to correspond to the frequency band associated with the carrier frequency to be used. Switching a receiver between carrier frequencies may take time. Thus, in receivers with a single filter chain, transitioning between different carriers may cause the receiver to encounter intervals during which information can not be received due to the switching process.

Wireless terminals, e.g., mobile nodes, communicating with a base station on a given carrier frequency and moving through a multi-carrier system need to decide when to make a handoff and transition to a new carrier frequency, e.g., corresponding to a new cell and/or sector. As discussed above, an adjacent sector and/or cell may use a different carrier frequency, and as a sector or cell boundary is crossed, a wireless terminal will normally have to identify and switch to the new carrier frequency.

Typically a mobile node, listens to one carrier frequency band at a given time due to constraints in the hardware and cost associated with the receiver. This is because, for cost reasons, multiple parallel receiver filter chains are often too expensive to be practical. In some known systems a mobile node waits until communications are lost or significantly degraded on the operating carrier band being used before switching to another carrier. In some systems, a wireless terminal periodically switches its receiver to a different carrier band to check for signal presence and/or strength. Unfortunately, while switched to search for another carrier, the receiver can not receive signals from the carrier that is currently in use. The known methods of determining what carriers are available to switch to and when to switch to a new carrier may result in interrupted communications, gaps during the hand-off process, and/or wasted resources in monitoring and determining the appropriate carrier frequency band.

In view of the above discussion, it should be appreciated that there is a need for improved methods for determining when a wireless terminal should initiate a handoff. Preferably, any new or improved methods should not require a mobile node to switch its receiver to another frequency band to search for the carrier frequency of an adjacent cell or sector.

SUMMARY OF THE INVENTION

The invention allows a wireless terminal's receiver to remain on its current operating carrier frequency band, and still receive information from adjacent sector and/or cell base station transmitters which can be used to identify the carrier used by the neighboring sector or cell. This is achieved by controlling the base station transmitters in different sectors and/or cells to periodically transmit a signal, including a narrow (in terms of frequency) high power signal component, into the frequency band used in the neighboring sector or cell.

In a system using the invention, base station transmitters in different sectors and/or cells each periodically transmit a high power signal, referred to in the present application as a beacon signal, into the frequency band used in the neighboring sector or cell. Beacon signals are signals which include one or more narrow (in terms of frequency) signal components, e.g., signal tones, which are transmitted at relatively high power compared to other signals such as user data signals. In some embodiments beacon signals each include one or more signal components where each signal component corresponds to a different tone. A beacon signal component in some embodiments includes a per tone signal energy which is 10, 20, 30 or more times the average per tone signal energy of signal tones used to transmit user data and/or non-beacon control signals. The frequency of a beacon signal's component or components can be used to convey information such as the carrier used by the transmitter which transmitted the beacon to communicate user data, a cell identifier and/or a sector identifier corresponding to the transmitter which transmitted the particular beacon signal. Some information may be conveyed by using multiple beacon signals in which case the frequency of multiple beacon signal components conveys transmitter information, e.g., of the type just described.

Multiple beacons, e.g., multiple high power tones can be transmitted at the same time although in many embodiments at most a single beacon signal is transmitted by a transmitter in any given transmission time period, e.g., symbol transmission period. The single beacon signal may include a single high power signal tone or, in some embodiments, a few high power tones. Beacon signals, in one exemplary OFDM embodiment are transmitted by a transmitter in a transmission time corresponding to an OFDM symbol transmission time. However, this is simply an exemplary embodiment and the transmission time may be different in other embodiments.

Each beacon signal tone is transmitted e.g., at a predetermined frequency thereby allowing the frequency of the beacon signal components to be used in convey information, e.g., cell, sector and/or carrier information. In some embodiments, the beacon signal corresponds to a single tone. Beacon signals may be fixed in terms of frequency or they can be transmitted at different points in time at different frequencies, e.g., according to a predetermined pattern such as a particular hopping sequence corresponding to a cell or sector.

While in various embodiments the transmitter does not transmit user data when transmitting the beacon signal into the frequency band of the neighboring sector or cell, in some embodiments the transmitter continues to transmit user data and the beacon signal transmission is in addition to the transmission of data and/or other signals into the sector serviced by the transmitter.

The beacon signal transmitted into the neighboring cell or sector's frequency band can be detected by mobile nodes within the neighboring cell or sector without having to change the frequency band to which the mobile node has its receiver adjusted. The relatively high power level of beacon signals makes them easy to detect. The frequency of a detected beacon signal can be readily determined by the wireless terminal, e.g., based on the received energy in each tone. The detection of the beacon frequency can, and in many cases where the beacon is from a neighboring cell often does, occur before the wireless terminal acquires synchronization information, such as carrier frequency or symbol timing, related to the cell or sector transmitting the beacon signal. The frequencies of received beacon signals can, and in various embodiments are, used to determine the sector or cell from which the detected beacon signals were transmitted. By storing information about received beacon signal strength, e.g., power, and comparing the strength of beacon signals corresponding to different sectors, a mobile can determine when a handoff should be performed. The carrier frequency to which the handoff is to be made can be determined from the frequency of the received beacon signal which triggered the handoff operation. The carrier frequency of the neighboring sector or cell is determined from stored information indicating the carrier frequency used by different sectors and/or cells to transmit beacon signals.

The information obtained from beacon signals transmitted by neighboring sectors or cells, into the frequency band of the adjacent sector or cell, allows wireless terminals in the adjacent sector or cell to identify when a boundary region is being approached, when the wireless terminal should perform a hand-off, and what new carrier frequency should be used following the handoff. This can be accomplished without having the wireless terminal switch its receiver to a different frequency band in an attempt to identify the carrier of the neighboring sector and/or cell.

The amount of time a transmitter transmits a beacon signal into a neighboring sector or cell's frequency band is usually a fraction of the time the transmitter transmits user data into the frequency band it uses to communicate user data, e.g., text, video, voice or other user application data.

Numerous additional features, benefits and embodiments of the present invention are discussed in the detailed description which follows.

DETAILED DESCRIPTION OF THE INVENTION

Figure 1:
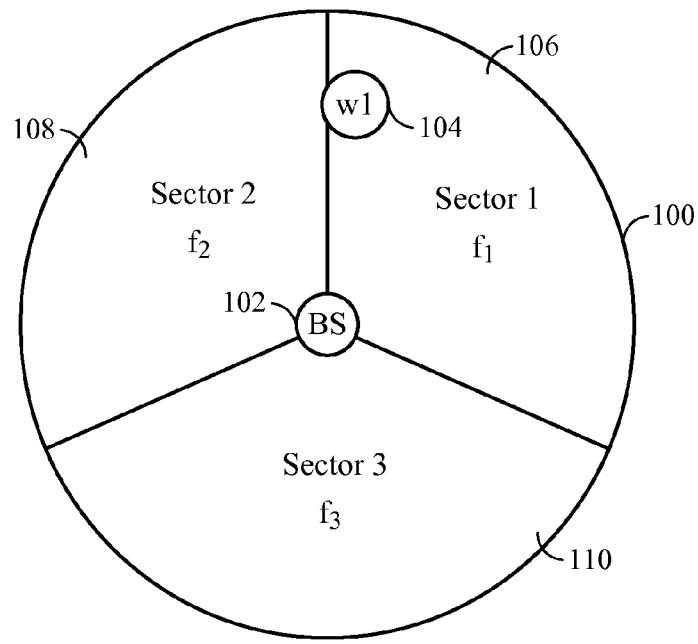
FIG. 1 is a drawing of an exemplary 3 sector multi-carrier cell including a sectorized base station and a wireless terminal presently situated on a sector boundary; the base station and wireless terminal implemented in accordance with an exemplary embodiment of the present invention.

Each cell includes a base station which transmits different signals into each sector of a cell. Each cell includes one or more sectors. Separate antenna and/or transmitter may be provided for each sector of a cell. The base station, in accordance with the invention, transmits multiple beacon signals, e.g., at different times, from each sector of a cell. One or more beacon signals are normally transmitted within the frequency band used by the particular sector to communicate information, e.g., user data and/or control information intended for specific individual wireless terminals, to wireless terminals within the sector. User data may include text data, voice data and/or other types of user application data. Such beacon signals can be used to convey information, e.g., a sector identifier, a cell identifier, and/the carrier frequency used in the sector. In accordance with the present invention, the base station uses a sector transmitter to periodically transmit a beacon signal at a predetermined frequency within the frequency band, which is used, e.g., by an adjacent sector or cell to communicate user data and/or control signals corresponding to specific wireless terminals in the adjacent sector or cell. As a result, multiple sectors may transmit beacon signals into the same frequency band, e.g., at different times. To make it easy to distinguish the sector which is the source of a beacon signal within a particular frequency band, each sector transmits a beacon at a different predetermined frequency within any given frequency band used by a sector.

The strength of the beacon signals received from adjacent sectors and/or cells may be compared to the strength of the beacon signal received from its own current base station sector transmission to determine when a handoff should be performed. In accordance with the invention, the monitoring and evaluation of beacon signals from adjacent sectors/cells allows the wireless terminal to, in many cases, make a seamless hand-off without a disruption or interruption in service that occurs in systems where it is more difficult to determine the carrier frequency to be used following the handoff.

In one exemplary OFDM (Orthogonal Frequency Division Multiplexed) embodiment, a beacon signal is implemented as a relatively high powered signal that is transmitted on a single tone, e.g., frequency. The power used to transmit the beacon signal is, in some embodiments, more than twice, and in many cases more than 5 or 6 times, the average power of the highest power signal tone used to communicate data or pilot signals in the sector corresponding to the transmitter transmitting the beacon signal.

In some but not necessarily all embodiments, the power used to transmit the beacon signal is more than twenty times the average per tone power of all the tones used to communicate data or pilot signals in the sector from which the beacon is transmitted, where the average per tone power is relative to a transmission period, e.g., a one or two second transmission period preceding the transmission of the beacon signal. For example, if during the a 1 second period 100 different tones were used, the average per second per tone power would be the total transmitted power in the 1 second period divided by 100. A one second period may include multiple symbol transmission periods. Assuming a beacon is transmitted in one symbol period on one tone, the beacon signal would have in the particular exemplary embodiment, more than 20 times the average energy of a tone transmitted in a symbol transmission period in the 1 second time period.

When a beacon signal is transmitted in one exemplary OFDM embodiment, a significant amount of transmission power is concentrated on one or a small number of tones, e.g., a single tone which comprises the beacon signal. The amount of power is sufficient to reliably detect the beacon and is higher than the average power of the other non-beacon tones which are transmitted. Tones which are not used for the beacon signal may, and sometimes are, left unused. However, in some cases tones which are not used to transmit the beacon are still used to transmit other information at a power level that is lower than the beacon power level. In some embodiments, when transmitting a beacon signal into the frequency band used by an adjacent sector, some of the tones used in the frequency band of the sector transmitting the beacon signal may go unused by the sector's transmitter as the power is concentrated on the beacon signal. However, such a limitation is not mandatory.

FIG. 1 shows an exemplary 3 sector cell 100 corresponding to a base station (BS) 102 implemented in accordance with one exemplary embodiment of the present invention. BS 102 is a sectorized base station. The base station (BS) 102 transmits ordinary signals, e.g., user data and control signals, into sector 1 106 using carrier frequency $f_1$. The BS 102 transmits ordinary signals into sector 2 108 using carrier frequency $f_2$, and ordinary signals into sector 3 110 using carrier frequency $f_3$. A wireless terminal (WT) 104, implemented in accordance with the present invention, is shown on the boundary area between sector 1 106 and sector 2 108. WT 104 may receive signals, e.g., one or more beacon signals, from adjacent sector base station transmitters without the WT 104 having to change its receiver's frequency band setting. Received information from its own current and adjacent sector base station transmitters may be used by WT 104 when making handoff decisions.

Figure 2:
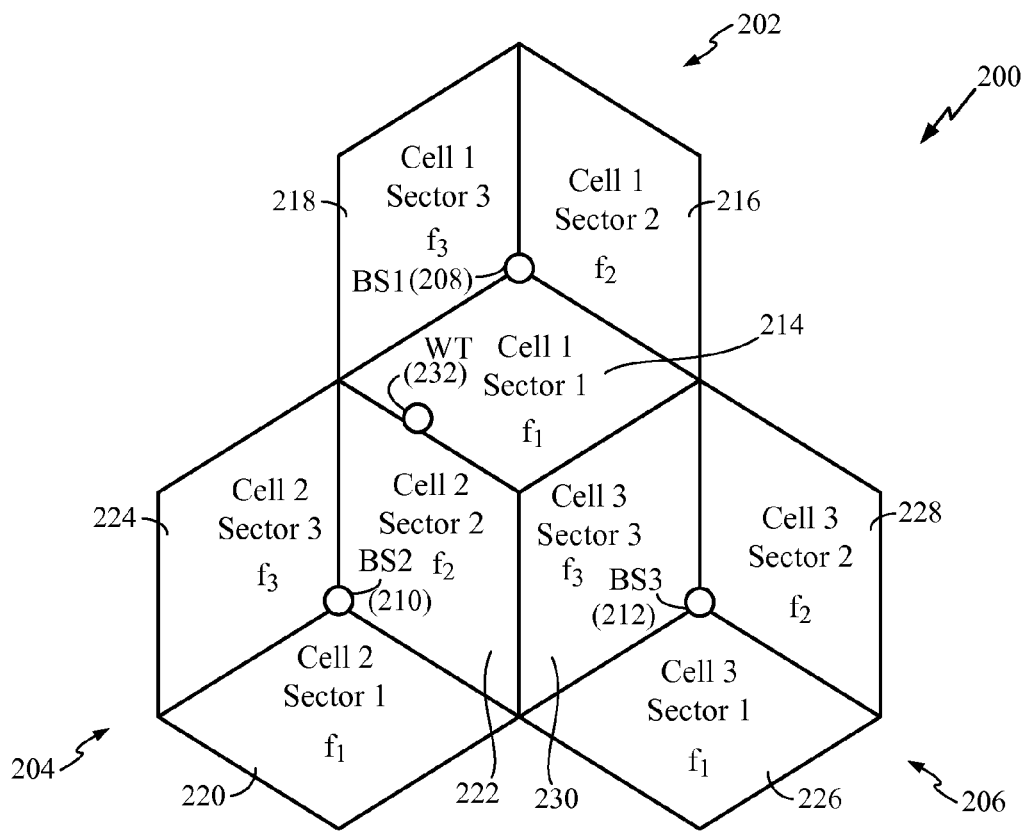
FIG. 2 is a drawing of an exemplary multi-carrier wireless communications system, implemented in accordance with the present invention, including three exemplary cells, each cell including a sectorized base station, the system also including an exemplary wireless terminal presently situated on a cell boundary.

FIG. 2 shows three exemplary cells, (Cell 1, Cell 2, Cell 3) in an exemplary wireless communications system 200 in accordance with the present invention. Each cell includes a base station and 3 sectors, each of the three sectors uses a different carrier frequency ($f_1$, $f_2$, $f_3$) and corresponding frequency band for ordinary communications with wireless terminals within the particular sector. The same three carrier frequencies $f_1$, $f_2$, $f_3$, and bandwidth associated with each carrier is reused in each of the cells. Cell 1 202 includes base station 1 (BS1) 208 and 3 sectors (sector 1 214, sector 2 216, sector 3 218) using carrier frequencies ($f_1$, $f_2$, $f_3$), respectively. Cell 2 204 includes base station 2 (BS2) 210 and 3 sectors (sector 1 220, sector 2 222, sector 3 224) using carrier frequencies ($f_1$, $f_2$, $f_3$), respectively. Cell 3 206 includes base station 3 (BS3) 212 and 3 sectors (sector 1 226, sector 2 228, sector 3 230) using carrier frequencies ($f_1$, $f_2$, $f_3$), respectively. FIG. 2 also includes an exemplary wireless terminal (WT) 232, implemented in accordance with the present invention. The WT is situated on the boundary between sector 1 214 of cell 1 202 and sector 2 222 of cell 2 204. WT 232 may receive signals, e.g., one or more beacon signals transmitted to the frequency band, used in cell 1 sector 1 corresponding to carrier $f_1$, from adjacent sector base station transmitters from its own cell and/or adjacent cells without the WT 232 having to change its receiver's frequency band setting from the band corresponding to carrier frequency $f_1$. Received information from its own current and adjacent sector base station transmitters may be used by WT 232 when making handoff decisions.

Handoffs of WT 232 may be performed between different base station sectors of different cells or between different base station sectors of the same cell in accordance with the methods of the present invention.

The total frequency band of the FIG. 2 example is subdivided into 3 frequency bands (slots) situated contiguously. The frequency bands are the same size in each sector. In general, the total frequency band need not be identical in each sector, and the frequency bands (slots) may be disjoint and need not be identical in each sector. In some embodiments, the BSs 208, 210, 212 transmit beacon signals, e.g., high power broadcast signals. In some embodiments, the beacon signal transmission in each sector, when scheduled, may alternate between the 3 frequency ranges (bands) over time. In other embodiments, the base station transmits beacon signals in more than one of the carrier frequency bandwidth ranges (bands) with beacons being transmitted in multiple frequency bands from sector transmitter at the same time.

Figure 3:
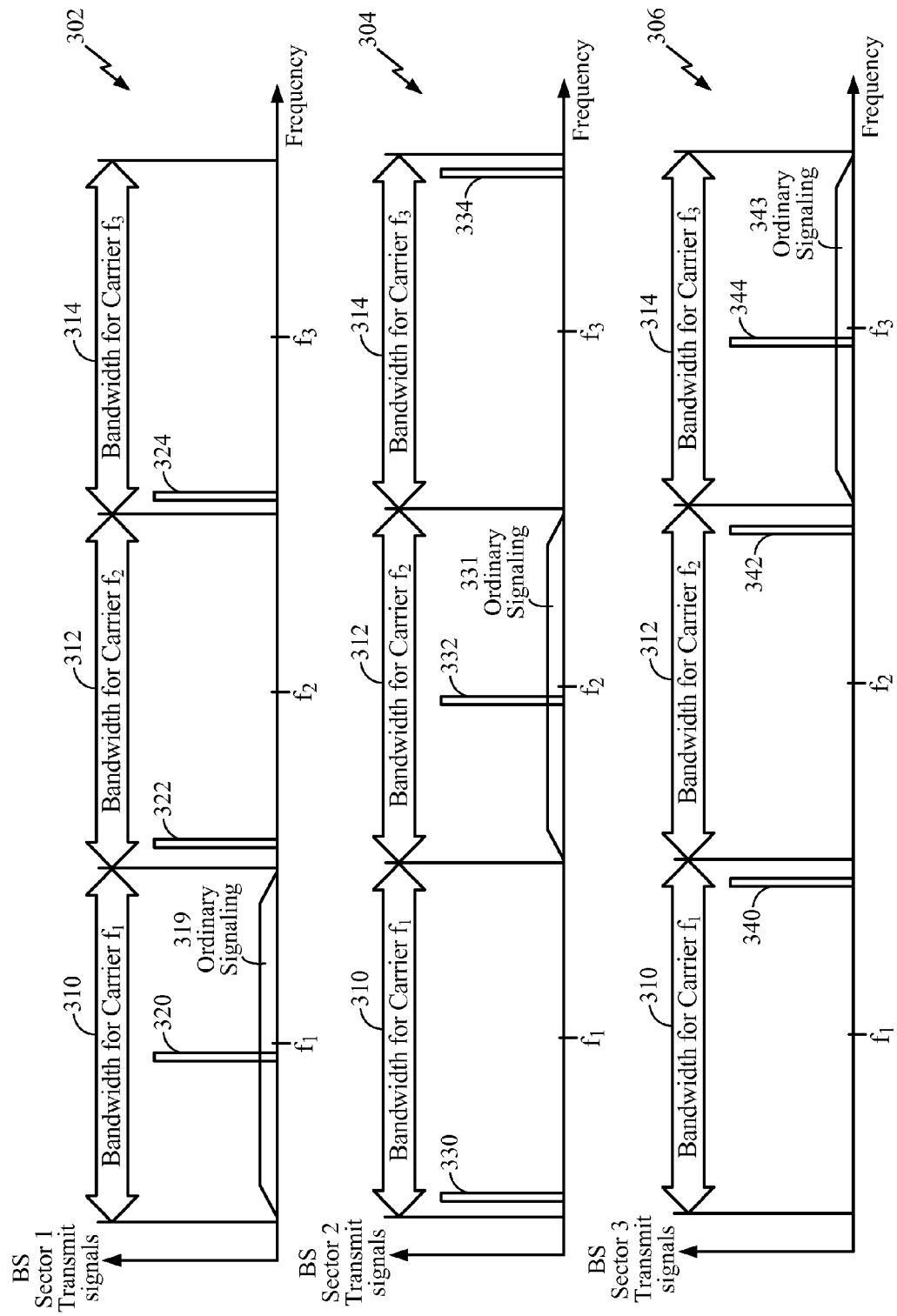
FIG. 3 shows exemplary base station sector transmitter signaling vs frequency for different sector transmitters of an exemplary cell, in accordance with the present invention.

FIG. 3 shows three graphs 302, 304, 306 indicating exemplary base station sector transmission signaling vs frequency. The exemplary signaling may be transmitted in a cell such as the exemplary cell 100 shown in FIG. 1 or in any of the exemplary cells (202, 204, 206) shown in FIG. 2.

The top graph 302 of FIG. 3, shows signaling from base station sector 1 transmitter.

The graph 302 is a composite of signals which may be transmitted at different times, e.g., during different symbol transmission periods. First frequency band 310 which is centered around carrier frequency $f_1$ is used for transmitting signals and information to wireless terminals in sector 1 as indicated by the label ordinary signaling 319. Periodically, e.g., when not transmitting data, e.g., ordinary signals, the transmitter in sector 1 transmits a beacon signal S1F1 (Sector 1 carrier Frequency 1) 320 within the first frequency band. This frequency may be a fixed offset from the first carrier frequency and can be used by the wireless terminals to identify and synchronize with the carrier frequency being used in the first sector. To provide information to WTs in neighboring sectors where carrier $f_2$ is used, periodically, the first sector transmitter transmits a beacon signal S1F2 322 at a predetermined frequency within the second frequency band 312 corresponding to the second carrier frequency $f_2$. This signal can be detected by WTs in the adjacent sector without those terminals having to adjust their receiver frequency from the band 312 associated with carrier $f_2$ to another band, e.g., the first frequency band 310 used in sector 1. In addition, to provide information to WTs in neighboring sectors where carrier $f_3$ is used, periodically, the first sector transmitter transmits a beacon signal S1F3 324 at a predetermined frequency within the third frequency band 314 corresponding to the third carrier frequency $f_3$. This signal can be detected by WTs in adjacent sectors where the third frequency band is used without those terminals having to adjust their receiver frequency from the third frequency band 314 to another band, e.g., the first frequency band 310 used in sector 1.

The middle graph 304 of FIG. 3, shows signaling from base station sector 2 transmitter. The graph 304 is a composite of signals which may be transmitted at different times, e.g., during different symbol transmission periods. Second frequency band 312 which is centered around carrier frequency $f_2$ is used for transmitting signals and information to wireless terminals in sector 2 as indicated by the label ordinary signaling 331. Periodically, e.g., when not transmitting data, e.g., ordinary signals, the transmitter in sector 2 transmits a beacon signal S2F2 (Sector 2 carrier Frequency 2) 332 within the second frequency band 312. This frequency may be a fixed offset from the second carrier frequency and can be used by the wireless terminals in sector 2 to identify and synchronize with the carrier frequency being used in the second sector. To provide information to WTs in neighboring sectors where carrier $f_1$ is used, periodically, the second sector transmitter transmits a beacon signal S2F1 330 at a predetermined frequency within the first frequency band 310 corresponding to the first carrier frequency $f_1$. This signal can be detected by WTs in the adjacent sector which uses the first carrier frequency without those terminals having to adjust their receiver frequency to another band, e.g., the second frequency band 312 used in sector 2. In addition, to provide information to WTs in neighboring sectors where carrier $f_3$ is used, periodically, the second sector transmitter transmits a beacon signal S2F3 334 at a predetermined frequency with the third frequency band 314 corresponding to the third carrier frequency $f_3$. This signal can be detected by WTs in adjacent sectors where the third frequency band is used without those terminals having to adjust their receiver frequency to another band, e.g., the second frequency band 312 used in sector 2.

The bottom graph 306 of FIG. 3, shows signaling from base station sector 3 transmitter. The graph 306 is a composite of signals which may be transmitted at different times, e.g., during different symbol transmission periods. Third frequency band 314 which is centered around carrier frequency $f_3$ is used for transmitting signals and information to wireless terminals in sector 3 as indicated by the label ordinary signaling 343. Periodically, e.g., when not transmitting data, e.g., ordinary signals, the transmitter in sector 3 transmits a beacon signal S3F3 (Sector 3 carrier Frequency 3) 344 within the third frequency band. The frequency of this beacon signal may be a fixed offset from the third carrier frequency and can be used by the wireless terminals in sector 3 to identify and synchronize with the carrier frequency being used in the third sector. To provide information to WTs in neighboring sectors where carrier $f_1$ is used, periodically, the third sector transmitter transmits a beacon signal S3F1 340 at a predetermined frequency within the first frequency band 310 corresponding to the first carrier frequency $f_1$. This signal can be detected by WTs in the adjacent sector which uses the first carrier frequency without those terminals having to adjust their receiver frequency to another band, e.g., the third frequency band 314 used in sector 3. In addition, to provide information to WTs in neighboring sectors where carrier $f_2$ is used, periodically, the third sector transmitter transmits a beacon signal S3F2 342 at a predetermined frequency with the second frequency band 312 corresponding to the second carrier frequency $f_2$. This signal can be detected by WTs in adjacent sectors where the second frequency band is used without those terminals having to adjust their receiver frequency to another band, e.g., the third frequency band 314 used in sector 3.

Each beacon signal can uniquely identify the carrier associated with the sector from which the beacon signal originated. In FIG. 3, the nine exemplary beacon signals shown are at different frequencies. Thus, it is possible to match a frequency of a detected beacon signal to a frequency from a set of known beacon frequencies to determine which sector transmitter was the source of a particular detected beacon signal.

In accordance with the invention, a wireless terminal, e.g., mobile node, may receive the beacon signals from its own base station sector transmitter and different, e.g., adjacent, base station sector transmitters. The beacon signals are received within the same frequency band that the wireless terminal currently uses for ordinary signaling, e.g., data and/or control signaling thereby avoiding requiring the WT to switch frequency bands. The WT makes beacon signal strength, e.g., power, measurements. These measurements may be in addition to frequency e.g., tone, measurements. Comparisons of the strength of different received beacon signals, from different base station sector transmitters are used to decide when to make a handoff to a carrier frequency, used by an adjacent sector, to supply information to wireless terminals within the adjacent sector. The beacon signal comparison also indicates to the wireless terminal which carrier frequency that the wireless terminal should use for ordinary signaling following the hand-off. In some embodiments, this carrier frequency is determined to be the carrier frequency for ordinary signaling used by the base station sector transmitter which transmitted the stronger of the received beacon signals.

Consider for example, the wireless terminal 104 shown in FIG. 1, which is operating in sector 1, and is therefore using carrier frequency $f_1$ and its associated bandwidth 310 for ordinary signaling, e.g., receiving information from the base station. However, it is also monitoring for beacon signals within the frequency band 310 corresponding to carrier frequency $f_1$. Refer to the left portion of FIG. 3, showing the signaling transmitted by the BS in each of the three sectors in the first frequency band 310 corresponding to carrier $f_1$. The wireless terminal 104 compares the received strength of beacon signal 320 from sector 1, with the received strength of adjacent sector beacon signals 330 and 340 which are also detected within the first frequency band 310. As the wireless terminal nears the boundary separating sector 1 and sector 2, the reception strength of beacon signal S2F1 330 within the first frequency band transmitted by the BS sector 2, increases in strength relative to the received signal strength from the sector 1 beacon signal S1F1 320. At some point, based upon this comparison of received beacon signal strengths and criteria within the wireless terminal, the wireless terminal will initiate a hand-off to carrier frequency $f_2$, the frequency used for ordinary signaling in sector 2. The wireless terminal knew to switch to carrier frequency $f_2$ and not carrier frequency $f_3$ based upon a known pre-determined understanding between the base station and wireless terminals, e.g., based upon the beacon tone position in the frequency domain of the stronger received beacon signal.

Signaling from each sector of the same cell may be timing synchronized with respect to one another. In some embodiments, there is a fixed time offset between the transmissions of beacon signals by adjacent sector transmitters of the same cell to a given carrier band. In some embodiments, there is a fixed time offset between the transmissions of beacon signals by a given sector transmitter to different carrier bands.

The same or a similar method of the invention, described with respect to handoffs at sector boundaries, is also used with respect to handoffs at cell boundaries as in the case of the wireless terminal 232 shown in FIG. 2 situated on a cell boundary. In such a case, the handoff is from the sector of one cell to the sector of another cell. In regard to cells, the location of the beacon may also be used to convey cell information, e.g., a cell identifier such as a slope identifier. Different cells may use different predetermined frequencies for beacon signals. Changes in beacon signals over time and/or the tone locations of beacon signals may be used to carry cell identification information, e.g., slope information, and/or sector identification information, e.g., sector type. In one embodiment, the changes in the beacon signal are changes in the beacon location via a hopping pattern on the tones which may indicate a slope used as a cell identifier that corresponds to a cell.

Figure 4:
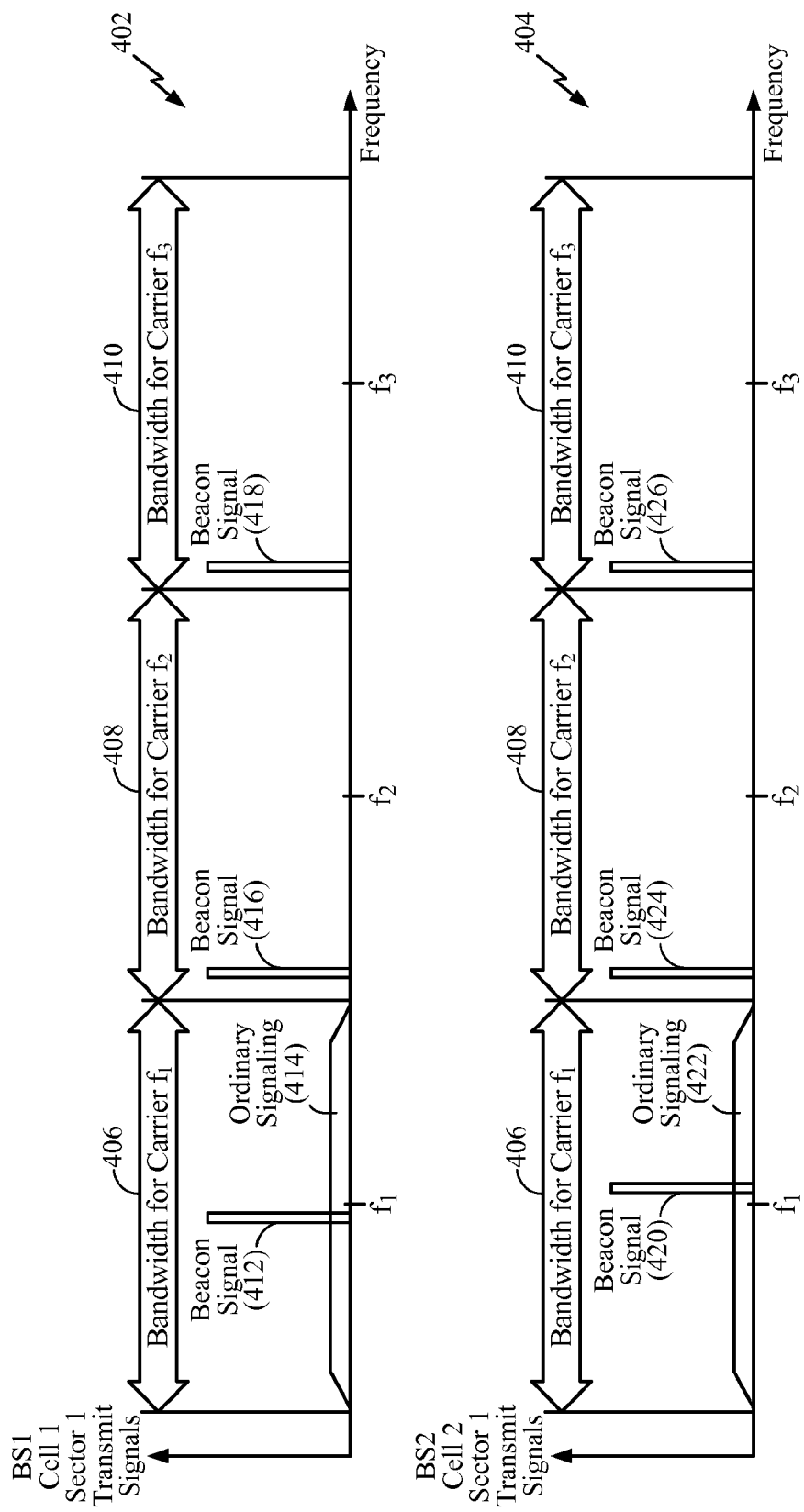
FIG. 4 shows exemplary base station sector transmitter signaling vs frequency for the same type designation sector transmitters of different cells, in accordance with the present invention.

FIG. 4 shows an example where two different adjacent cells have a slight variation in beacon frequency location designations in the same sector, exemplary sector 1, to provide beacon signal identification to a sector and cell level. For example, drawing 402 may correspond to signals transmitted from BS1 208 sector 1 214 of cell 1 202 transmitter of FIG. 2, while drawing 404 may correspond to signals transmitted from BS2 210 sector 1 220 of cell 2 204 transmitter of FIG. 2. Drawing 402 includes a bandwidth associated with carrier frequency $f_1$ 406, a bandwidth associated with carrier frequency $f_2$ 408, and a bandwidth associated with carrier frequency $f_3$ 410. Within bandwidth for carrier $f_1$ 406, the BS 1 sector 1 transmitter transmits a beacon signal 412 and ordinary signaling 414, e.g., user data and control signals. Within bandwidth for carrier $f_2$ 408, the BS 1 sector 1 transmitter transmits a beacon signal 416. Within bandwidth for carrier $f_3$ 410, the BS 1 sector 1 transmitter transmits a beacon signal 418. The various signals 412, 414, 416, and 418 may be transmitted at different times, e.g., with the ordinary signaling 414 being transmitted most of the time, and a beacon signal, from the set of beacon signals including 412, 416, 418, being transmitted occasionally in a predetermined sequence on a periodic basis in place of the ordinary signaling 414. Ordinary signaling 414 includes user data including at least one of voice, text, and user application data. Beacon signals 412, 416, and 418 convey transmitter information but no user specific information. Drawing 404 includes a bandwidth associated with carrier frequency $f_1$ 406, a bandwidth associated with carrier frequency $f_2$ 408, and a bandwidth associated with carrier frequency $f_3$ 410. Within bandwidth for carrier $f_1$ 406, the BS 2 sector 1 transmitter transmits a beacon signal 420 and ordinary signaling 422, e.g., user data and control signals. Within bandwidth for carrier $f_2$ 408, the BS 2 sector 1 transmitter transmits a beacon signal 424. Within bandwidth for carrier $f_3$ 410, the BS 2 sector 1 transmitter transmits a beacon signal 426. The various signals 420, 422, 424, and 426 may be transmitted at different times, e.g., with the ordinary signaling 422 being transmitted most of the time, and a beacon signal, from the set of beacon signals including 420, 424, 426, being transmitted occasionally in a predetermined sequence on a periodic basis in place of the ordinary signaling 422. Beacon signals 412 and 420 within the same band 406 are at different frequency locations allowing a wireless terminal receiving the beacon signal to distinguish between the two cells. Beacon signals 416 and 424 within the same band 408 are at different frequency locations allowing a wireless terminal receiving the beacon signal to distinguish between the two cells. Beacon signals 418 and 426 within the same band 410 are at different frequency locations allowing a wireless terminal receiving the beacon signal to distinguish between the two cells.

The two cells need not be, and generally are not, timing synchronized with respect to one another. Therefore, in inter-cell handoff operations, the wireless terminal may need to perform timing synchronization operations, e.g., they make symbol transmission timing adjustments based on one or more signals received over the air from the new cell, before transmitting user data, e.g., text or voice data. Beacon signals or other broadcast signals may be used in achieving coarse timing synchronization and minimizing break time during handoff operations in accordance with the present invention.

Figure 5:
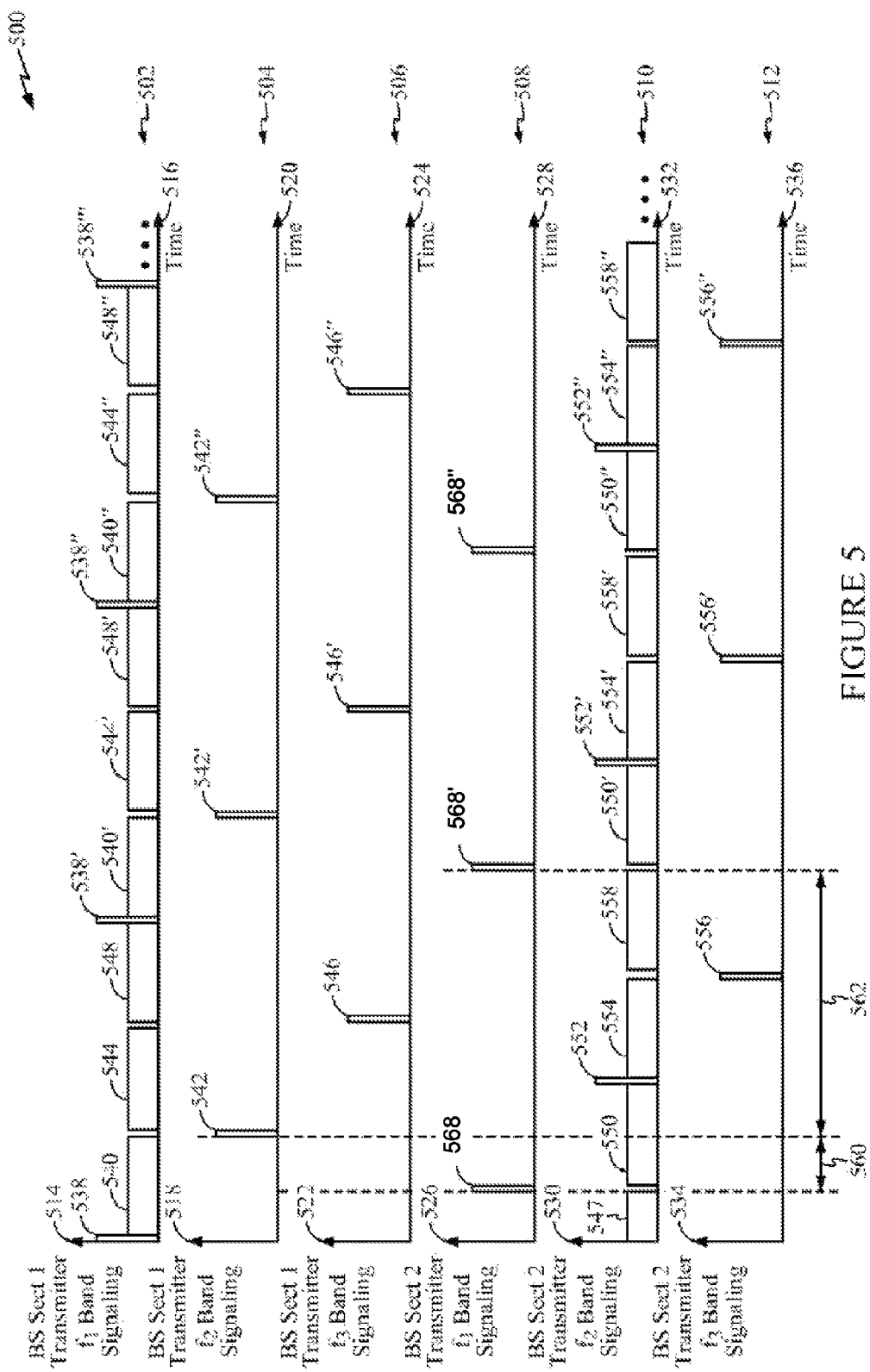
FIG. 5 is a drawing of exemplary base station sector transmitter signaling vs time for three exemplary frequency bands for two adjacent base station sector transmitters, in accordance with an exemplary embodiment of the present invention.

FIG. 5 shows a drawing 500 of exemplary signaling from two base station sector transmitters, e.g., adjacent base station sector transmitters of the same cell base station, in accordance with the methods of the present invention. Drawing 502 is a plot of base station sector 1 transmitter signaling into the carrier $f_1$ frequency band on the vertical axis 514 vs time on the horizontal axis 516. Drawing 504 is a plot of base station sector 1 transmitter signaling into the carrier $f_2$ frequency band on the vertical axis 518 vs time on the horizontal axis 520. Drawing 506 is a plot of base station sector 1 transmitter signaling into the carrier $f_3$ frequency band on the vertical axis 522 vs time on the horizontal axis 524. Drawing 508 is a plot of base station sector 2 transmitter signaling into the carrier $f_1$ frequency band on the vertical axis 526 vs time on the horizontal axis 528. Drawing 510 is a plot of base station sector 2 transmitter signaling into the carrier $f_2$ frequency band on the vertical axis 530 vs time on the horizontal axis 532. Drawing 512 is a plot of base station sector 2 transmitter signaling into the carrier $f_3$ frequency band on the vertical axis 534 vs time on the horizontal axis 536. In the exemplary signaling plots (502, 504, 506, 508, 510, 512) the time axes (516, 520, 524, 528, 532, 536) are the same. In exemplary plots (502, 504, 506, 508, 510, 512) ordinary signaling which includes user data is represented by wide low height rectangles, while beacon signaling including transmitter information but no user specific data is represented by narrow high rectangles. User data includes at least one of voice, text, and user application data. Beacon signals are signals which concentrate at least 60% of the sector transmitter power on tones occupying less than ⅓ of the frequency band.

The sector 1 base station transmitter sequentially transmits: beacon signal 538 into the $f_1$ frequency band, ordinary signaling 540 into the $f_1$ frequency band, a beacon signal 542 into the $f_2$ frequency band, ordinary signaling 544 into the $f_1$ frequency band, a beacon signal 546 into the $f_3$ frequency band, and ordinary signaling 548 into the $f_1$ frequency band. This sequence of signaling type and band of transmission corresponding to signaling set (538, 540, 542, 544, 546, 548) repeats as illustrated by signaling set (538', 540', 542', 544', 546', 548'), followed by signaling set (538", 540", 542", 544", 546", 548").

The sector 2 base station transmitter transmits sequentially: ordinary signaling 547 into the $f_2$ frequency band, a beacon signal 568 into the $f_1$ frequency band, ordinary signaling 550 into the $f_2$ frequency band, a beacon signal 552 into the $f_2$ frequency band, ordinary signaling 554 into the $f_2$ frequency band, a beacon signal 556 into the $f_3$ frequency band, and ordinary signaling 558 into the $f_2$ frequency band. This sequence of signaling type and band of transmission corresponding to signaling set (568, 550, 552, 554, 556, 558) repeats as illustrated by signaling set (568', 550', 552', 554', 556', 558'), followed by signaling set (568", 550", 552", 554", 556", 558").

The first and second base station transmitters are in the same cell and there is a fixed timing offset between the first sector base station transmitter transmitting a beacon signal into the $f_2$ band and the second sector base station transmitter transmitting a beacon signal into the $f_1$ frequency band. The timing relationship between beacon signals 568 and 542 is shown as interval 560 while the timing relationship between beacon signals 542 and 568' is shown as interval 562. In some embodiments, the timing synchronization between sector transmitters of the same cell is such that beacon signals are transmitted by different sector transmitters at the same time.

The time interval comprising the composite of the intervals corresponding to signaling 538, 540, 544, and 548 is a first period of time in which the first sector base station transmitter is operated to transmit in a first frequency band, the $f_1$ band, while not transmitting into the second frequency band, the $f_2$ band. The time interval corresponding to beacon signal 542 is a second period of time in which the first sector base station transmitter is operated to transmit into the second frequency band, the $f_2$ band, and the first sector base station transmitter does not transmit into the first frequency band, the $f_1$ band. The second period of time is at least less than one fifth the first period of time. In some embodiments, the second period of time is less than 1/20 the first period of time. The operations repeat as illustrated by signaling 538', 540', 544' and 548' in the $f_1$ band, and signaling 542' in the $f_2$ band.

The time interval comprising the composite of the intervals corresponding to signaling 550, 552, 554, and 558 is a third period of time in which the second sector base station transmitter is operated to transmit in the second frequency band, the $f_2$ band, while not transmitting into the first frequency band, the $f_1$ band. The time interval corresponding to beacon signal 568 is a fourth period of time in which the second sector base station transmitter is operated to transmit into the first frequency band, the $f_1$ band, and the second sector base station transmitter does not transmit into the second frequency band, the $f_2$ band. The fourth period of time is at least less than one fifth the third period of time. In some embodiments, the fourth period of time is less than 1/20 the third period of time. The operations repeat as illustrated by signaling 550', 552', 554' and 558' in the $f_2$ band, and signaling 568' in the $f_1$ band.

If the two base station transmitters were from adjacent cells, the signaling would be similar; however, the timing between two transmitters would not necessarily be synchronized.

Figure 6:
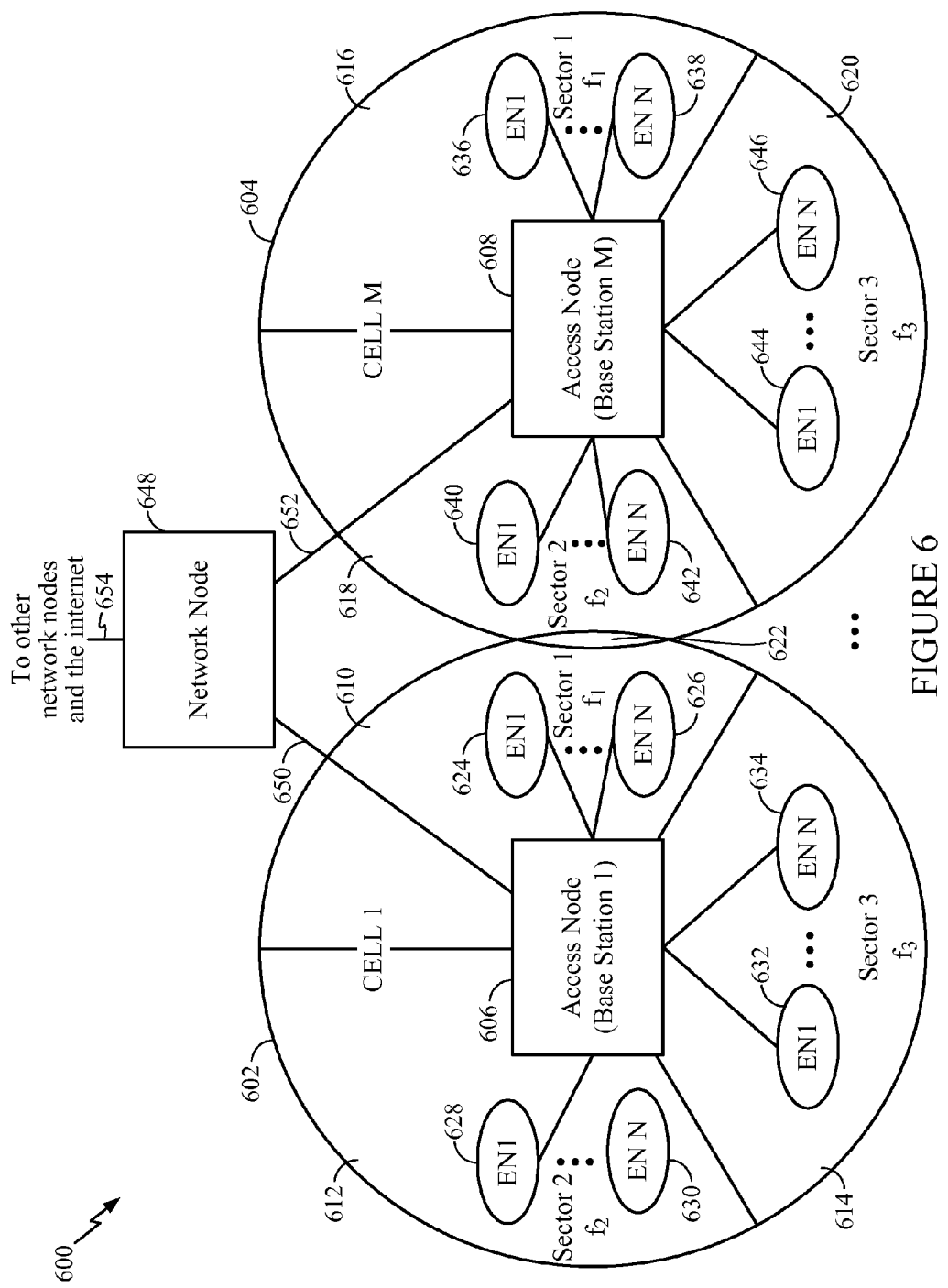
FIG. 6 is a drawing of an exemplary multi-carrier sectorized wireless communications system, implemented in accordance with the present invention and using methods of the present invention.

FIG. 6 shows an exemplary communications system 600 implemented in accordance with the present invention which utilizes the methods of the present invention. The exemplary system includes a plurality of cells (cell 1 602, cell M 604). Each cell represents the wireless coverage area for an access node, e.g., a base station. Cell 1 602 corresponds to base station 1 606 and cell M 604 corresponds to base station M 608. Each cell is subdivided into a plurality of sectors. The exemplary system shows a 3 sector embodiment; however, in accordance with the invention, cells with less or more than 3 sectors are also possible. The exemplary system uses a different carrier frequency in each of the sectors of a cell. In other embodiments, frequencies may be reused by sectors within a cell, e.g., reused by those sectors that are not adjacent. Sector 1 uses carrier frequency $f_1$; sector 2 uses carrier frequency $f_2$; sector 3 uses carrier frequency $f_3$. The same carrier frequencies are used in the same sectors of other cells of the exemplary system. In some embodiments, the carrier frequencies used in different cells of the system may vary slightly. In still other embodiments, the carrier frequencies used in different cells may be substantially different. Cell 1 602 includes sector 1 610, sector 2 612, and sector 3 614. Cell M 604 includes sector 1 616, sector 2 618, and sector 3 620. An exemplary boundary region 622 is shown where cell 1 sector 1 610 overlaps with cell M sector 2 618, in which handoff operations may occur, in accordance with the methods of the present invention. Handoff operations may also occur in boundary areas between the different sectors of the same cell, in accordance with the methods of the present invention.

The exemplary system of FIG. 6 also includes a plurality of end nodes EN1, EN N, e.g., wireless terminals such as mobile nodes, in each of the sectors of each cell. The wireless terminals are coupled to the base stations via wireless links. If the end nodes are mobile devices, they may move throughout sectors and cells of the system. The end nodes may receive and process signals, e.g., beacon signals within the same carrier band, from a plurality of base station sector transmitters in accordance with the methods of the present invention. The end nodes may use information obtained from the plurality of base station sector transmitters in the process of initiating and performing handoff operations from one base station sector attachment point to another base station sector attachment point, in accordance with the methods of the present invention. Mobile devices may sometimes be referred to as mobile communications devices or mobile nodes. Cell 1 602 sector 1 610 includes a plurality of ENs (EN1 624, EN N 626); cell 1 602 sector 2 612 includes a plurality of ENs (EN1 628, EN N 630); cell 1 602 sector 3 614 includes a plurality of ENs (EN1 632, EN N 634). Cell M 604 sector 1 616 includes a plurality of ENs (EN1 636, EN N 638); cell M 604 sector 2 618 includes a plurality of ENs (EN1 640, EN N 642); cell 1 604 sector 3 620 includes a plurality of ENs (EN1 644, EN N 646).

The access nodes (base stations) (606, 608) are coupled to a network node 648, e.g., a router, via network links, (650, 652), respectively. Network node 648 is coupled to other network nodes and the Internet via network link 654. Network links (650, 652, 654) may be, e.g., fiber optic cables.

Sector boundary regions are identified as dividing lines within each cell separating the three sectors (610, 612, 614) or (616, 618, 620), and a cell boundary region (622) is shown as an overlapping area between cell 1 and cell M. As wireless terminals travel throughout the system and approach and/or traverse sector and/or cell boundaries handoff operations involving a change in carrier frequency may be performed in accordance with the invention.

In accordance with the invention the base stations (606, 608) periodically transmit beacon signals in each of three frequency bands (associated with the three carrier frequencies $f_1, f_2, f_3$) into each sector of each cell. In accordance with the invention, the end nodes (624, 626, 628, 630, 632, 634, 636, 638, 640, 642, 644, 646) are monitoring the beacon signals in the frequency band of current operation, in order to make decisions regarding inter-sector and/or inter-cell handoffs.

Figure 7:
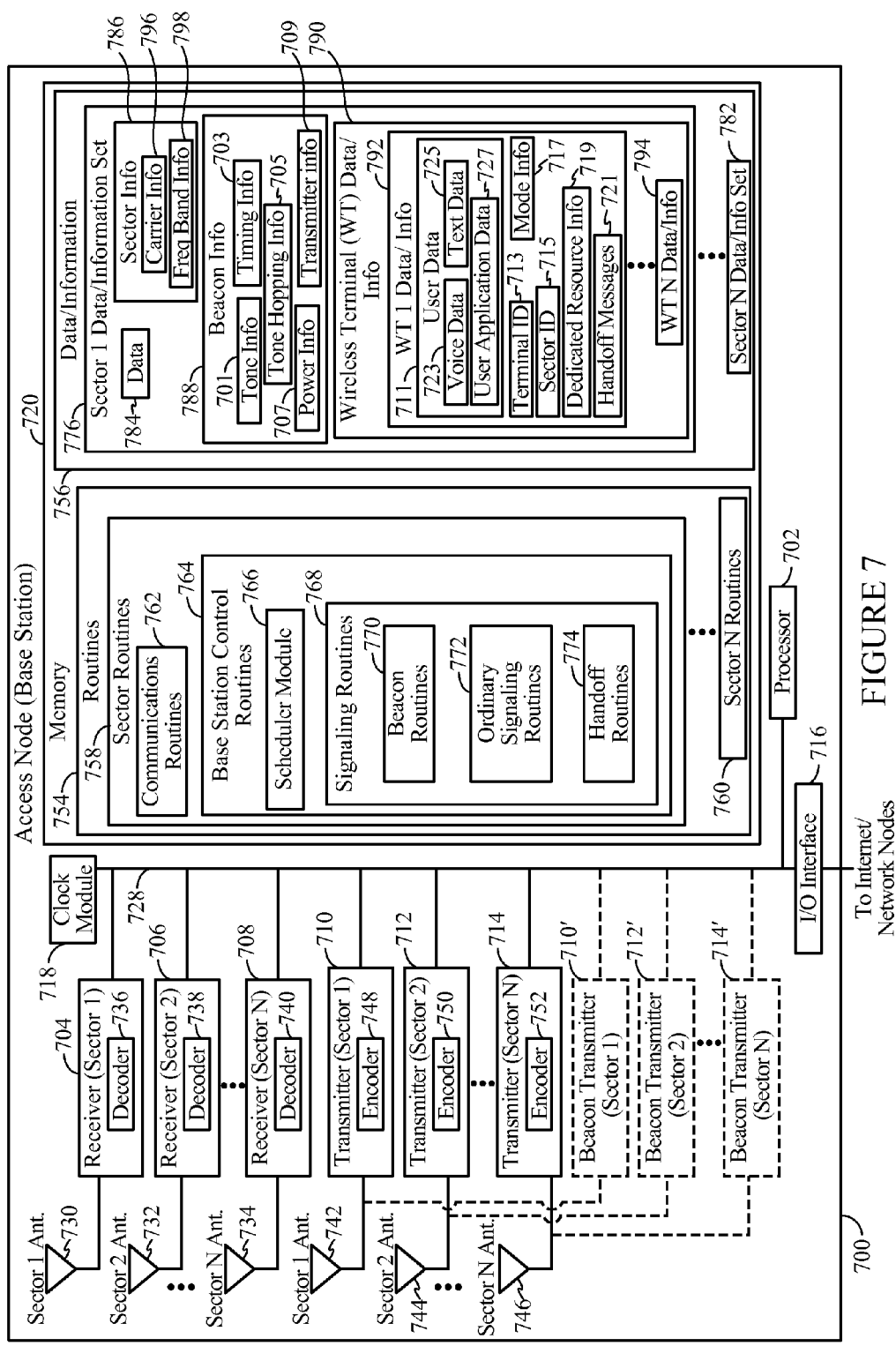
FIG. 7 is a drawing of an exemplary base station, implemented in accordance with the present invention and using methods of the present invention.

FIG. 7 illustrates an exemplary access node (base station) 700 implemented in accordance with the present invention. The base station 700 of FIG. 7 may be a more detailed representation of any of the base stations of the system of FIG. 6, 1 or 2. The base station 700 includes a processor 702, e.g., CPU, a plurality of receivers, e.g., one for each sector of the base station 700 (sector 1 receiver 704, sector 2 receiver 706, ... sector N receiver 708), a plurality of transmitters, e.g., one for each sector of the base station (sector 1 transmitter 710, sector 2 transmitter 712, ... sector N transmitter 714), an I/O interface 716, a clock module 718, a memory 720. Beacon transmitter circuits, e.g., one for each sector of the base station (beacon sector 1 transmitter 7102', beacon sector 2 transmitter 712', ... beacon sector N transmitter 714'), may be included as part of the sector transmitter in embodiments where different circuits are used to generate beacon signals and ordinary control/user data signals. Each base station sector receiver (704, 706, 708) is coupled to a sector antenna (sector 1 receive antenna 730, sector 2 receive antenna 732, sector N receive antenna 734), respectively, and can receive signals, e.g. uplink signals including requests for handoffs, timing control signals, power control signals, and user data, from wireless terminals in the sector covered. Each sector transmitter (710, 712, 714) transmits beacon signals into the frequency band used for ordinary signaling in its own sector and into the frequency bands used for ordinary signaling by adjacent sector transmitters in the system. Each receiver (704, 706, 708) includes a decoder (736, 738, 740), respectively, which decodes received uplink encoded signals to extract the information being communicated. Each sector transmitter (710, 712, 714) is coupled to a sector antenna (sector 1 transmit antenna 742, sector 2 transmit antenna 744, sector N transmit antenna 746), respectively, and can transmit signals, including beacon signals including transmitter information, and ordinary downlink signaling including user data, assignment signals, acknowledgement signals, and pilot signals, in accordance with the invention, into the sector covered. Each sector transmitter (710, 712, 714) includes an encoder (748, 750, 752), respectively, for encoding downlink information prior to transmission. In some embodiments the base station 700 includes and uses separate receivers, transmitters, and/or antennas for each of the sectors of the cell. In some embodiments, a base station uses: a single receiver with sectorized functionality to receive signals from each of the sectors covered by the base station, a single transmitter with sectorized functionality to transmit into each of the sectors covered by the base station, and/or sectorized antennas, e.g., an antenna with different elements corresponding to different sectors. In some embodiments, sector beacon transmitter circuits (710, 712, 714) are included and are coupled to transmit antennas (742, 744, 746) of the corresponding sector, respectively; the sector beacon transmitters (710', 712', 714') are used to transmit some or all of the beacon signaling, allowing transmission of multiple beacon signals into one or more cells while user data is transmitted thus limiting disruptions in normal ordinary signaling transmissions by offloading some or all of the beacon transmission functions to beacon related circuits.

The base station I/O interface 716 couples the base station 700 to other network nodes, e.g., other access nodes (base station), routers, AAA servers, home agent nodes, and the Internet. I/O interface 716 allows WTs using a BS 700 as the network attachment point to communicate with other WTs, e.g., peer nodes, using a different BS as their network attachment point.

Clock module 718 is used for maintaining timing synchronization between the various sectors covered by the base station. Synchronization between the different sectors of the same cell allows for beacon signals to be transmitted from different base station sector transmitters with fixed timing offsets between the beacon signals. Synchronization between different sectors of the same cell also provides for more efficient intra-cell inter-sector handoff operations, as the WT involved in the handoff can, in some embodiments, omit some timing synchronization operations that would otherwise have been required.

Memory 720 includes routines 754 and data/information 756. The processor 702 executes routines 754 and uses the data/information 756 in the memory 720 to control the operation of the base station 700 including the normal functions of scheduling, base station power control, base station timing control, communication, ordinary signaling, and including the new features of the invention including the beacon signaling and handoff operations.

The data/information 756 in memory 720 includes a plurality of sets of data/information, e.g., one for each sector covered by the base station (sector 1 data/information set 776, sector N data/information set 782). Sector 1 data/information set 776 includes data 784, sector information 786, beacon information 788, and wireless terminal (WT) data/information 790. Data 784 includes user data to be transmitted to and received from wireless terminals. Sector information 786 includes carrier information 796 and frequency band information 798. Carrier information 786 includes the carrier frequencies associated with sector 1 and with adjacent sectors in the system. Frequency band information 786 includes bandwidth information corresponding to the carrier information 786. Sector information 786 identifies the carrier and band associated with ordinary signaling within sector 1, and the carriers and bands in which beacon signal should be transmitted but no user specific data.

The beacon information 788 includes tone information 701, timing information 703, tone hopping information 705, power information 707, and transmitter information 709. Tone information 701 includes information associating beacon signals from sector 1 transmitter with specific frequencies or tones. Timing information 703 includes, e.g., information identifying beacon signal transmission timing such as when sector 1 transmitter 710 should transmit a beacon signal into the $f_1$ carrier band, when sector 1 transmitter 710 should transmit a beacon signal into the $f_2$ carrier band, and when sector 1 transmitter 710 should transmit a beacon signal into the $f_3$ carrier band. Timing information 703 also include information identifying timing relationships between beacon signals, e.g., timing relationships and sequences between beacon signals transmitted by sector 1 transmitter 710 and timing relationships between beacon signals transmitted by adjacent sector transmitters, e.g., sector 1 transmitter 710 and sector 2 transmitter 712. Tone hopping information 705, e.g., information used to generate hopping sequences used for the beacon signals, e.g., when the tone or set of tones of a beacon corresponding to sector 1 transmitter in a specific frequency band may change as a function of time. Power information 707 includes transmission power level information for each of the beacon signals that are transmitted by the sector 1 transmitter. In some embodiments, the base station sector transmitter concentrates at least 60% of the sector transmission power on the tones of the beacon signal. Transmitter information 709 includes information conveyed by the beacon signals associating the beacon signal with a specific base station sector transmitter, e.g., a base station sector transmitter identifier.

WT data/info 790 includes a plurality of WT data/information sets for each WT: WT 1 data/info 792, WT N data/info 794. WT 1 data/info 790 includes user data 711, terminal ID information 713, sector ID information 715, mode information 717, dedicated resource information 719, and handoff messages 721. User data 711, e.g., data to/from peer nodes of WT 1 in a communications session with WT1 includes voice data 723, text data 725, and/or user application data 727. Terminal ID information 713 includes information associating the WT to the base station such a sector 1 base station assigned identifier. Sector ID information 715 includes information identifying the sector in which WT 1 is currently attached and associating WT 1 to a specific carrier frequency used for ordinary signaling by the identified attachment point sector transmitter, e.g., sector 1 transmitter. Sector ID information 715 also includes information identifying a sector to which WT1 has requested as a new attachment point in a handoff request. Mode information 717 includes information identifying the state of operation of WT 1, e.g., ON, Hold, Sleep, Access, etc. Dedicated resource information 690, e.g., downlink and uplink segments, includes traffic channel segments which have been allocated to WT 1 by scheduler module 766. Handoff messages 721 includes information related to handoff operations, e.g., a handoff request message from WT1 in response to received, measured and compared beacon signals from a plurality of base station sector transmitters.

Routines 754 includes a plurality of sets of routines, e.g., one for each sector covered by the base station (sector 1 routines 758, . . . , sector N routines 760). Routines 758 include communications routines 762, and base station control routines 764. The communications routines 762 implement the various communications protocols used by the base station. The base station control routines 764, using data/information 756, control base station sector 1 operation including the receiver 704, transmitter 710, optional beacon transmitter 722, I/O interface 716, scheduling, ordinary control and data signaling, beacon signaling, and handoff operation, in accordance with the present invention. Base station control routines 764 includes a scheduler module 766 and signaling routines 768. Signaling routines 768 includes beacon routines 770, ordinary signaling routines 772, and handoff routines 774. Scheduler module 659, e.g., a scheduler, schedules air link resources, e.g. bandwidth over time in the form of segments, to wireless terminals for uplink and downlink communications.

Signaling routines 768 control: the receiver, the decoder, the transmitter, the encoder, ordinary signal generation, beacon signal generation, data and control tone hopping, signal transmission, signal reception, and handoff signaling. The beacon routines 770 uses the data/information 756 including beacon information, e.g., sector 1 beacon info 788, to control the generation and transmission of beacon signals in accordance with the invention. In accordance with the invention, beacon signals may be transmitted by each sector transmitter in each of the carrier frequency bands identified as used by that sector for ordinary signaling or by an adjacent sector in the system for ordinary signaling. In accordance with some embodiments of the invention, when a beacon signal is transmitted by a sector transmitter into a different frequency band than the frequency band that it uses for ordinary signaling, then ordinary signaling by that base station sector transmitter is suspended during that time interval corresponding to the beacon signal.

In some embodiments, the beacon signals from sector 1 of the base station 700 are transmitted through the sector transmitter 710. In other embodiments, some or all of the beacon signals from sector 1 of BS 700 may be transmitted by the beacon transmitter 722.

Ordinary signaling routines 772 control operation of ordinary downlink and uplink signaling. Ordinary downlink signaling includes pilot signals, assignment signals, acknowledgment signals, other control signals, and downlink traffic channel signals. Downlink traffic channel signals include user specific signals, e.g., signals conveying user data 711 to a specific WT.

Handoff routines 774 control the handoff signaling, e.g., handoff messages 721, being transmitted from and received by base station 700 sector 1.

Although the routines 758 and data/information 756 have been shown in FIG. 7 on a per sector basis, in some embodiments, some of the functions, routines, modules, and/or information may be shared between sectors. For example, communication routines and functions related to the operation of I/O interface 702 may be common and shared between the sectors.

Figure 8:
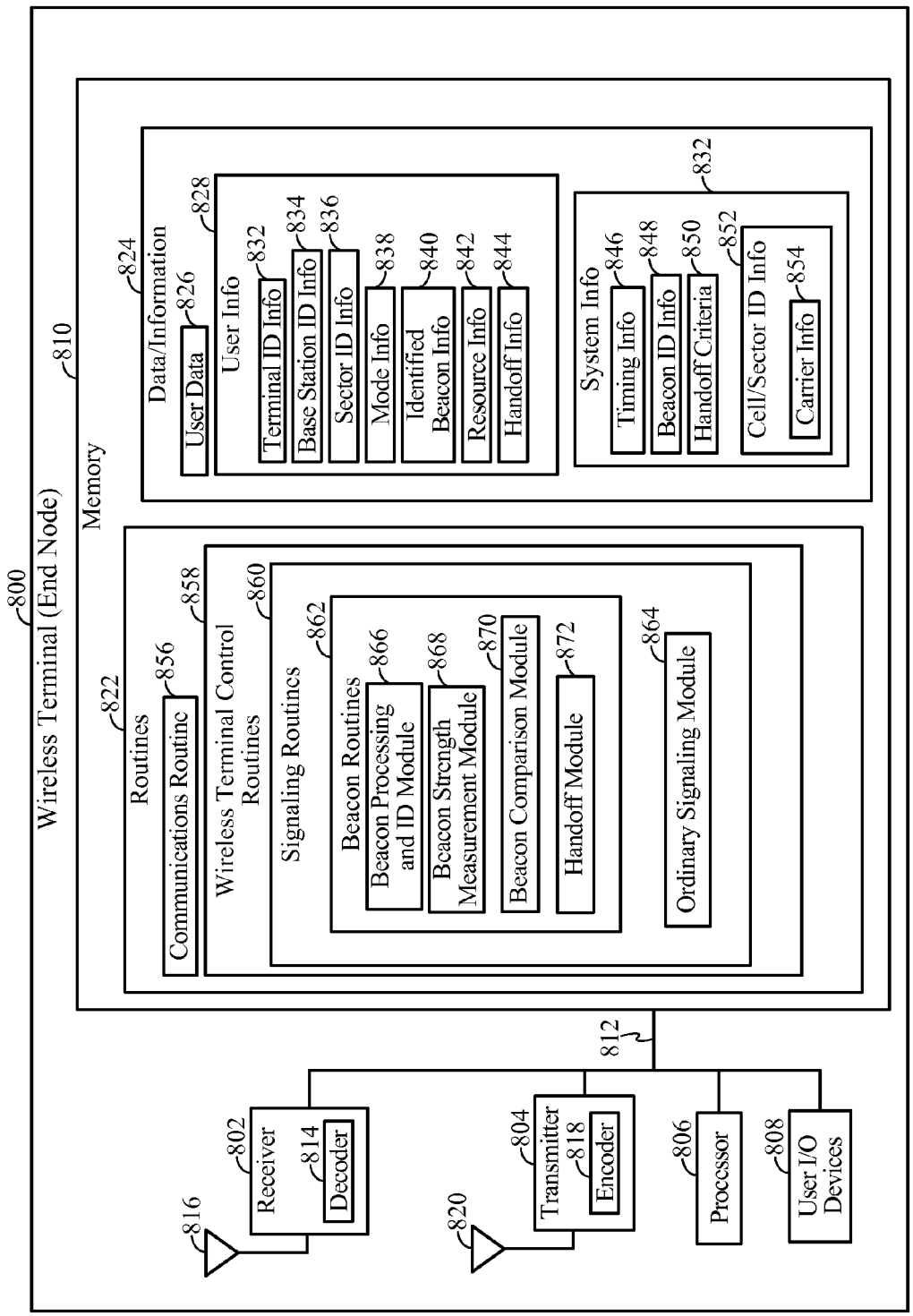
FIG. 8 is a drawing of an exemplary wireless terminal, implemented in accordance with the present invention and using methods of the present invention.

FIG. 8 illustrates an exemplary wireless terminal (end node) 800 such as a mobile node, implemented in accordance with the present invention. The wireless terminal 800 of FIG. 8 may be a more detailed representation of any of the end nodes of the system of FIG. 6, 1 or 2. The exemplary wireless terminal 800 includes a receiver 802, a transmitter 804, a processor 806, e.g., CPU, user I/O devices 808, and memory 810 coupled together via a bus 812 over which the various elements can interchange data and information. The receiver 802 including a decoder 814 is coupled to an antenna 816 over which the wireless terminal 800 may receive signaling including beacon signaling transmitted from a plurality of base station sector transmitters within the same carrier band in accordance with the invention. In exemplary WT 800, receiver 802 may be tuned to one carrier band at a time. The decoder 814 in the receiver 802 may decode ordinary signaling and use error correction coding processes to attempt to recover information overwritten or interfered with by beacon signaling. The transmitter 804 is coupled to an antenna 820 and may transmit signaling and information to the base station including requests to initiate a handoff to another sector which uses a different carrier frequency. User I/O devices 808, e.g., keyboard, keypad, mouse, microphone, display, and/or speaker allow the user of WT 800 to enter user data intended for peer nodes and output received user data sourced from peer nodes. The wireless terminal's memory 810 includes routines 822 and data/information 824. The processor 806 executes the routines 822 and uses the data/information 824 in memory 810 to control the operation of the wireless terminal 800 including implementing the beacon related functions of the present invention.

Wireless terminal data/information 824 includes user data 826 such as data information and files intended to be sent to/or received from a peer node in a communications session with the wireless terminal 800. User data 826 includes received voice, text, and/or user application data received as part of the ordinary downlink signaling in downlink traffic channel segments. User information 828 includes terminal ID information 832, base station ID information 834, sector ID information 836, mode information 838, identified beacon information 840, resource information 842, and handoff information 844. The terminal ID information 832 may be an identifier, assigned to the WT 800 by the base station sector to which the WT is coupled, that identifies the wireless terminal 800 to the base station sector. Base station ID information 834 may be, e.g., a value of slope associated with the base station and used in hopping sequences that identifies the base station among a plurality of base station within the communications system. Sector ID information 836 includes information identifying the sector ID of the sectorized base station's transmitter/receiver through which ordinary signaling is being communicated, and corresponds to the sector of the cell in which the wireless terminal 800 is located. Mode information 838 identifies the current state of the wireless terminal 800, e.g., on/hold/sleep/access, etc. Identified beacon information 840 may include: information on each of the beacon signals that have be received and measured, e.g., cell/sector ID, signal strength level, filtered signal strength level, and carrier frequency associated with ordinary signaling in the sector from which the beacon signal was transmitted. Identified beacon information 840 may also include information comparing adjacent sector beacons to the current WT sector beacon, information comparing measured beacon signals and/or information derived from measured beacon signals to handoff criteria. Resource information 842 includes information identifying segments allocated to WT 800 including downlink traffic channel segments used to convey ordinary signals including user data 826 from a base station sector transmitter to specific WT 800. Handoff information 844 includes request information messages from WT 800 to initiate a handoff, e.g., based upon the comparison of received beacon signals from a plurality of base station sector transmitters.

Wireless terminal system information 832 includes timing information 846, beacon ID information 848, handoff criteria information 850, and cell/sector ID information 852. Timing information 846 includes OFDM transmission timing information including information defining: (i) an OFDM symbol transmission interval, (ii) grouping of OFDM symbol intervals such as slots, superslots, beaconslots, and ultra slots, intervals between beacon signals, (iii) beacon signals transmission timing with respect to ordinary signaling, and/or (iv) fixed timing relationships between beacon signals from different sector transmitters within the same cell. The beacon ID information 848 may include information, e.g., look-up tables, equations, etc, associating specific sector/cell beacons in the communication system to specific frequencies in specific carrier bands, allowing the WT 800 to identify the source base station sector transmitter of each received beacon signal. Handoff criteria 850 may include threshold limits used by the wireless terminal 800 to trigger a hand-off request to an adjacent sector/cell, e.g., a minimum threshold on the strength level of the beacon signal from the adjacent sector and/or a threshold level on the comparative strength of the adjacent sector received beacon signal with respect to the WT's own sector received beacon signal strength. Cell/sector ID information 852 may include information used to construct hopping sequences used in the processing, transmission, and reception of data, information, control signals, and beacon signals. Cell sector ID information 852 includes carrier information 854 which includes information associating each sector/cell of the base stations in the communications system with a specific carrier frequency, bandwidth, and set of tones.

Routines 822 include communications routine 856 and wireless terminal control routines 858. The wireless terminal control routines 858 include signaling routines 860. Signaling routines 860 include beacon routines 862 and ordinary signaling module 864.

Wireless terminal communications routine 856 implements the various communication protocols used by the wireless terminal 800. Wireless terminal control routines 858 perform the basis control functionality of the wireless terminal 800 including power control, timing control, signaling control, data processing, I/O, and control of the beacon related functions of the invention. The signaling routines 860, using the data/information 824 in memory 810, control the operation of the receiver 802 and transmitter 804. The beacon routines 862 include a beacon processing an identification (ID) module 866, a beacon strength measurement module 868, a beacon signal comparison module 870, and a handoff module 872. The beacon processing and ID module 866, using the system information 832 including beacon ID information 848 and cell/sector ID information 852, identifies a received beacon signal and stores the information in the user's identified beacon info 840. The beacon signal strength measuring module 868 measures the signal strength of a received beacon signal and stores the information in the user's identified beacon information 840. The beacon comparison module 870 compares identified beacon information in order to determine when to initiate a handoff to an adjacent sector/cell. The beacon comparison module 870 may compare individual beacon signal strength levels to minimum threshold levels in the handoff criteria 850. The beacon comparison module may compare relative signal strength levels between a WT's own current sector attachment point beacon signal and an adjacent sector/cell beacon signal. The beacon comparison module may compare the relative strength level difference measurements to threshold levels in the handoff criteria 850.

The handoff module 872, when triggered by output from the beacon comparison module 870, may generate signaling to initiate an inter-sector and/or inter-cell handoff. The new carrier frequency to be used following hand-off having been previously identified in accordance with the invention.

In some embodiments, a base station may not transmit beacon signals corresponding to each of the system frequency bands into a given sector. In some embodiments, a base station may limit the beacon signals transmitted into a given sector to a subset corresponding to the frequency bands used by its own sector and adjacent sectors for ordinary signaling. In some embodiments, a base station may limit the beacon signals transmitted into a given sector to a subset corresponding to the frequency bands used in adjacent sectors for ordinary signaling.

Although shown for an exemplary communications system with bandwidth divided between 3 carrier slots (frequency bands), the invention is applicable to other communications systems in which the same frequency band is not used everywhere in the system.

In some embodiments, various features of elements of the invention may be implemented in part of a communications system and not implemented in other parts of the system. In such an embodiment, the wireless terminals, implemented in accordance with the invention, may utilize the beacon signaling features and method of the invention when available in making decisions regarding inter-sector and/or inter-cell handoff, and may use known hand-off techniques otherwise.

Figure 9:
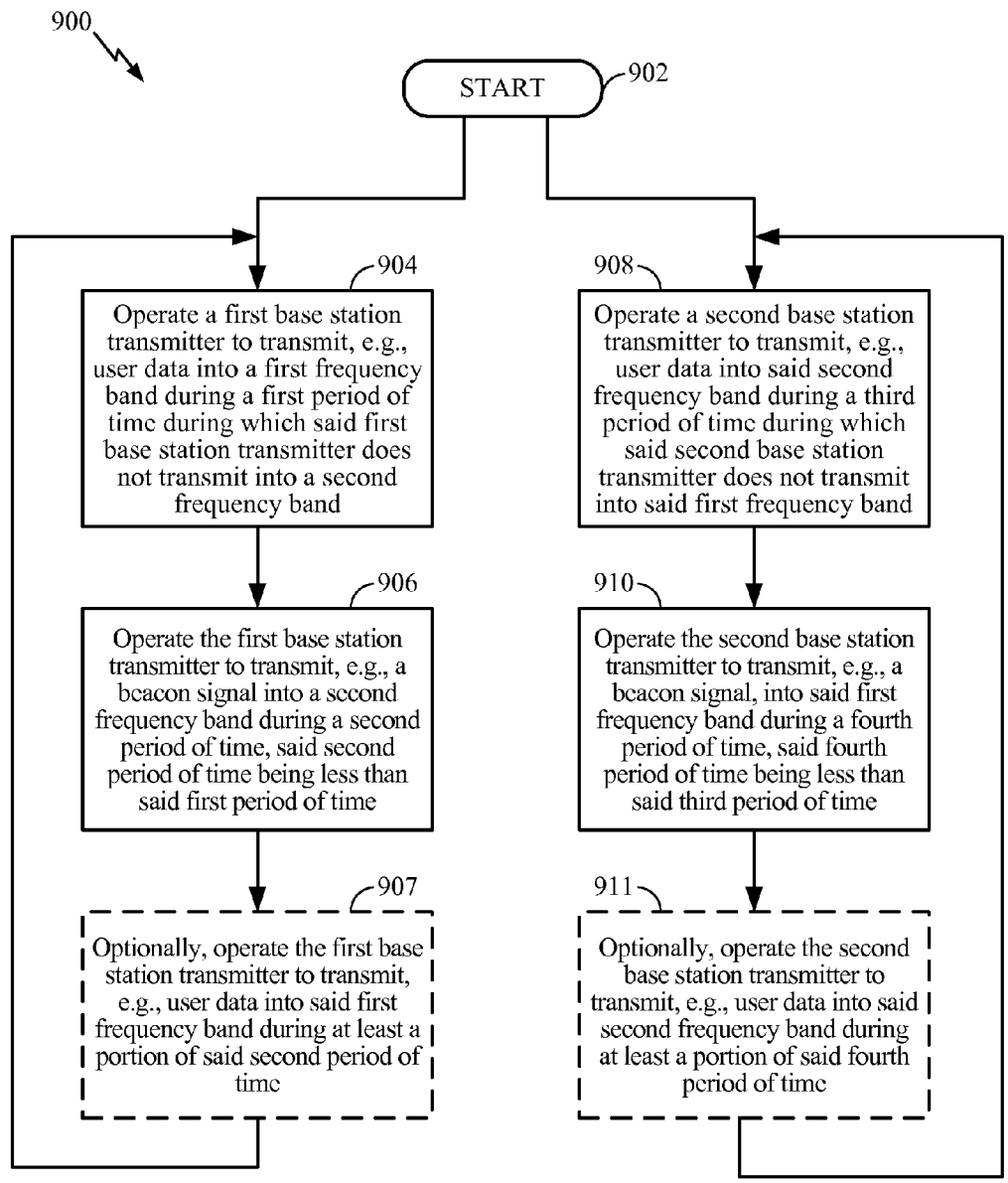
FIG. 9 is a drawing of an exemplary method of operating base stations in accordance with the methods of the present invention.

FIG. 9 is a flowchart 900 of an exemplary method of operating base station transmitters in a wireless communications system to transmit signals into different frequency bands, in accordance with the present invention. Operation starts in step 902, where the base station transmitters are powered on and initialized. Operation proceeds from step 902 to steps 904 and steps 908 in parallel. In step 904, a first base station transmitter is operated to transmit, e.g., user data including voice, text and/or images, into a first frequency band during a first period of time. During the first period of time said first base station transmitter does not transmit into a second frequency band. Operation proceeds from step 904 to step 906. In step 906, the first base station transmitter is operated to transmit, e.g., a beacon signal, into a second frequency band during a second period of time, said second period of time being less than said first period of time, e.g., 1/Nth the first period of time where N is a positive value greater than 2, e.g., 3, 5, 10, 20, 100 or some other value depending on the particular embodiment. In some embodiments the second period of time is at least less than one fifth said first period of time. In other embodiments, the second period of time is less than $\frac{1}{10}$ the first period of time and in still other embodiments the second period of time is less than $\frac{1}{100}$ the first period of time. In some embodiments the first and second frequency bands are the same size. As a result of the relationship between the first and second time periods, the first transmitter transmits into the first frequency band more than the second frequency band, e.g., 20, 50, 100, or more times. In some embodiments, the first base station transmits, e.g., user data or other signals, in to the first frequency band during all or a portion of said second time period. This occurs, when performed, in optional step 907. Operation proceeds from step 906 or 907, depending on the embodiment, back to step 904, and the sequence of steps 904, 906 and optional 907 is repeated, e.g., with steps 904 and 906 being performed at periodic intervals. In some implementations, in step 906, the first transmitter transmits 60 percent of the transmitted power on one or more tones occupying less than one fifth of the second frequency band. In the same or other embodiments, in step 906 the first base station transmitter transmits into the second frequency band a tone with at least 20 times the average per tone power used to transmit tone in a preceding 1 second time interval. Step 904 may involve transmitting user data such as voice, text and user application data, into the first frequency band on a plurality of tones.

In some embodiments, each of steps 904 and 906 involve transmitting at least one OFDM signal including at least one complex symbol. In some embodiments step 906 includes operating the first transmitter to transmit at least two OFDM symbols. In some implementations, the number of tones used in step 906 to transmit into the second frequency band is less than 3. The information transmitted in step 906 into the second frequency band, in some implementations is transmitter data that is transmitted using at least M times the amount of power on at least one tone than the first base station transmitter transmits on any one tone used to transmit user data during the first period of time, where M is a positive integer greater than 2, e.g., 3, 5, 6, 10, 20. 50 or some other number. The first transmission time period includes, in some embodiments multiple symbol transmission time periods while the second transmission time period includes at least one symbol transmission time period in one implementation, the first time period including more symbol transmission time periods than said second time period.

Returning to step 908, in step 908, a second base station transmitter is operated to transmit, e.g., user data and/or other signals, into said second frequency band during a third period. During the third period of time the second base station transmitter does not transmit into said first frequency band. The first and third periods of time may, but need not be, the same duration but need not be synchronized in terms of timing. Operation proceeds from step 908 to step 910. In step 910, the second base station transmitter is operated to transmit, e.g., a beacon signal, into said first frequency band during a fourth period of time which is less than said third period of time. The fourth period of time may, but need not be, the same length as said second period of time. In some embodiments the fourth period of time is at least less than one fifth said third period of time. In other embodiments, the fourth period of time is less than 1/10 the third period of time and in still other embodiments the fourth period of time is less than 1/100 the third period of time. Other periods, such as those discussed with regard to the first period of time are also possible for the third period of time. Operation proceeds from step 910 back to step 908, or to optional step 911 in the case where user data is transmitted into the second frequency band by the second transmitter for at least a portion of the fourth period of time. The sequence of steps 908 and 910 is repeated, e.g., at periodic intervals. Step 908 may involve the transmission of user data such as voice, text, image data, etc.

In some but not all embodiments, during the second period of time, said first base station transmitter does not transmit into said first frequency band. In some embodiments, the second period of time is less than one twentieth said first period of time. In some embodiments, said first and second frequency bands are the same size. In some embodiments, wherein the first and second frequency bands are the same size, the method includes operating the first base station transmitter to transmit into the second frequency band during a second period of time wherein transmitting into the second frequency band, depending on the particular embodiment includes concentrating at least 5, 10, 20, 30, 40, 50 or 60 percent of the transmitted power on one or more tones occupying less than one fifth of the second frequency band. In some embodiments, the power transmitted on one tone of the second frequency band during the second period of time includes at least twice the power transmitted by the transmitter on any other tone in the second frequency band during said second period of time.

In some embodiments, the operation of step 904 of operating the first base station transmitter to transmit into a first frequency band includes transmitting user data into said first frequency band. The user data includes, e.g., at least one of voice, text, and user application data. In some embodiments, step 906 of operating the first base station transmitter to transmit into a second frequency band during a second period of time includes transmitting transmitter information but no user specific data. In many embodiments steps 904 and step 906 each include operating the first base station transmitter to transmit at least one OFDM symbol including at least one complex symbol.

In many embodiments, the number of complex symbols transmitted in said second period of time is less than one tenth the number of complex symbols transmitted in said first period of time.

In various embodiments, during said fourth period of time, said second base station transmitter does not transmit into said second frequency band. In some embodiments, the second base station transmitter transmits user data, e.g. at least some voice or text data, during said third period of time. In some embodiments, the second base station transmitter transmits base station information, e.g., cell and sector identification information, during said fourth period of time but no user data. In some embodiments, the first and second base station transmitters are in physically adjacent cells. In some embodiments, the first and second base station transmitters are in the same cell and there is a fixed timing offset between performing step 906, using the first base station transmitter, and step 910 using the second base station transmitter.

For example, consider the following exemplary embodiment, which uses the method of flowchart 900. The first base station is in a first cell and the second base station is in an adjacent cell of the same OFDM wireless communications system. The first base station includes a first base station transmitter, and the second base station includes a second base station transmitter. The first frequency band is the frequency band used by the first base station for its regular downlink signaling, e.g., traffic channel assignment signals, downlink pilot signals, other control signals, and downlink traffic channel signals such as user data to wireless terminals including at least one of voice, text, and user application data. The first frequency band includes a set of at least 113 contiguous tones. The second frequency band is the frequency band used by the second base station for its regular downlink signaling, e.g., traffic channel assignment signals, downlink pilot signals, other control signals, and downlink traffic channel signals including at least one of voice, text, and user application data. The second frequency band being the same size as the first frequency band and also includes at least a set of 113 contiguous tones. The set of 113 tones of the first frequency band is non-overlapping with the set of 113 tones of the second frequency band in some exemplary embodiments. In the exemplary system, OFDM modulation symbols including complex symbols are conveyed using at least some of the tones.

In this particular exemplary embodiment, the operation of the first and second base station transmitters are not timing synchronized with respect to one another, e.g., symbol transmission timing at the base station in the first cell may be different from the symbol transmission timing at the base station in the second cell. In this one particular exemplary embodiment each base station transmitter transmits ordinary signaling during 903 out of every 904 successive OFDM transmission time intervals, and a beacon signal during the remaining one out of every 904 successive OFDM transmission time intervals. The beacon signal, when transmitted in this two cell example, is transmitted into either the base station transmitter's own frequency band, e.g., the band used by the base station sector in which the transmitter is located for ordinary signaling, or into a band used by an adjacent cell or sector for its ordinary signaling. This allows a wireless terminal with a single receiver chain to continue operations using its current attachment point and current frequency band yet still obtain information on other base stations which use different frequency bands for ordinary signaling.

In various embodiments, for a given base station transmitter, the base station transmitter the transmitter may alternates between beacon signals so as to sequentially transmit a beacon signal into its own band and one or more of the adjacent bands corresponding to ordinary signaling by adjacent cells or sectors. This timing is repeated periodically. The beacon signal in some embodiments is a high power signal, e.g., a single tone with more than twice, three times or even 10 times the average power, depending on the embodiment, of tones used to transmit user data. The high level of base station transmitter power associated with the beacon signal makes the beacon signal easily detectable and recognizable to wireless terminals monitoring the downlink broadcast signaling from the base stations. Different tones can be used by different base stations allowing the WT to identify the source of the beacon signal. Normally, the beacon signal does not convey any user specific data, but instead conveys transmitter information, e.g., transmitter identifier information and/or transmitter power level information.

As another example, consider the following exemplary embodiment, which uses the method of flowchart 900. Consider an exemplary OFDM communications system which includes sectorized cells with two or more sectors per cell. Each sectorized cell includes a base station or base stations and a set of base station transmitters, one base station transmitter corresponding to each sector. Each base station transmitter may be part of its own base station, or multiple base station transmitters may be grouped together as part of a single base station. First and second base station transmitters may correspond to adjacent sectors of the same cell. In such an exemplary embodiment, the first frequency band is the frequency band used by the first base station transmitter for its regular downlink signaling, e.g., traffic channel assignment signals, downlink pilot signals, other control signals, and downlink traffic channel signals such as user data to wireless terminals including at least one of voice, text, and user application data. The first frequency band, in this particular exemplary embodiment includes a set of at least 113 contiguous tones. The second frequency band in this particular embodiment is the frequency band used by the second base station transmitter for its regular downlink signaling, e.g., traffic channel assignment signals, downlink pilot signals, other control signals, and downlink traffic channel signals including at least one of voice, text, and user application data. The second frequency band, in this exemplary embodiment is the same size as the first frequency band also includes a set of 113 contiguous tones. In the exemplary embodiment, the set of 113 tones of the first frequency band is non-overlapping with the set of 113 tones of the second frequency band. OFDM modulation symbols including complex symbols are conveyed using at least some of the tones.

The operation of the first and second base station transmitters, in this second particular example, being in the same cell are timing synchronized with respect to one another. Each base station transmitter in this example transmits ordinary signaling during the majority of OFDM symbol transmission time periods, e.g., 903 out of every 904 successive OFDM symbol transmission time intervals, and a beacon signal during a much smaller number of symbol transmission time intervals, e.g., the remaining one out of every 904 successive OFDM symbol transmission time intervals. The beacon signal, when transmitted is transmitted into either the base station sector transmitter's own frequency band, the band used by the base station transmitter for ordinary signaling, or into a band used by an adjacent cell for its ordinary signaling. This allows a wireless terminal with a single receiver chain to continue operations using its current attachment point and current frequency band yet still obtain information on other adjacent base station transmitters which use different frequency bands for ordinary signaling. In this particular exemplary embodiment, the beacon signaling timing of adjacent sector base station transmitters of the same cell have a fixed timing offset.

For a given base station transmitter in this second example, the base station transmitter alternates between beacon signals, e.g., so as to sequentially transmit a beacon signal into its own band and each of the adjacent bands corresponding to ordinary signaling by adjacent sectors of the same cell. This timing is repeated periodically. The beacon signal is a high power signal, e.g., a signal as described in the context of the preceding example. The high level of power associated with the beacon signal makes the beacon signal easily detectable and recognizable to wireless terminals monitoring the downlink broadcast signaling from the base station transmitters. Different tones can be used by different base station transmitters allowing the WT to identify the source of the beacon signal. The beacon signal normally does not convey any user specific data, but does convey transmitter information, e.g., transmitter identifier information and/or transmitter power level information.

Numerous variations are possible, in accordance with the invention in terms of the specifics of the implementations. For example, a set of tones used for downlink signaling within a frequency band may comprise a different number than 113 tones, e.g., a number much larger such as 1000 tones. In some embodiments, the ratio of time dedicated by a base station transmitter to beacon signaling with respect to non-beacon downlink signaling may be different than 1/903; however, the ratio of beacon to non-beacon transmitter signaling time is, in most but not necessarily all embodiments, at least 1/5. In some embodiments a set of tones, e.g., two or several tones, comprise a beacon signal instead of one single tone.

Various exemplary embodiments which use the present invention have been discussed above. However, these are only a few of the many possible embodiments which can be implemented in accordance with the invention.

Various exemplary methods of the invention will now be described as a series of steps. Some embodiments involve performing different steps. Various combinations of steps are described below through various references to a previous group of steps.

Some exemplary methods, including different possible combinations of steps will now be described. The following methods are exemplary and not the sole methods and/or combinations of steps which may be covered by the present invention.

While described in the context of an OFDM system, the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, signal processing, beacon generation, beacon ID, beacon measuring, beacon comparison, handoff, message generation and/or transmission steps. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

The system of the present invention includes control modules, e.g., control circuitry and/or control software, for controlling the various elements of the system of the present invention to perform each of the various recited steps performed in accordance with the methods of the present invention. Different steps of a control routine or different element of a control circuit may control different operations, e.g., the implementation of different method steps. Accordingly, a control module may include multiple means, e.g., blocks of code, for performing one or more steps in accordance with the invention.

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. An apparatus, comprising:
   means for causing a base station transmitter to transmit ordinary signaling into a first frequency band during a first period of time, wherein the base station transmitter does not transmit into a second frequency band during the first period of time; and
   means for causing the base station transmitter to transmit a beacon signal into the second frequency band during a second period of time that is shorter than the first period of time, wherein the beacon signal is transmitted at higher power than the ordinary signaling;
   wherein the first and second periods of time repeat at a fixed periodicity.

2. The apparatus of claim 1, wherein the base station transmitter does not transmit into the first frequency band during the second period of time.

3. The apparatus of claim 1, wherein said means for causing the base station transmitter to transmit a beacon signal into the second frequency band is also for causing the base station transmitter to transmit a beacon signal into a third frequency band during a third period of time that is shorter than the first period of time; and
   wherein said base station transmitter does not transmit into either of said first and second frequency bands during said third period of time.

4. The apparatus of claim 3,
   wherein said base station transmitter is a sector transmitter of a base station; and
   wherein said ordinary signaling includes user data.

5. The apparatus of claim 4,
   wherein the first, second and third periods of time repeat at a fixed periodicity;
   wherein said sector transmitter does not transmit user data into said second and third frequency bands.

6. The apparatus of claim 4, wherein said sector transmitter is for a first sector that is located adjacent second and third base station sectors which use said second and third frequency bands, respectively, to communicate user data.

7. An apparatus, comprising:
   circuitry configured to cause a base station transmitter to:
      transmit ordinary signaling into a first frequency band during a first period of time having a first duration, wherein the base station transmitter does not transmit into a second frequency band during the first period of time; and
      transmit a beacon signal into the second frequency band during a second period of time having a second duration that is shorter than the duration of said first period of time, wherein the beacon signal is transmitted at higher power than the ordinary signaling;
   wherein the first and second periods of time repeat at periodic intervals.

8. The apparatus of claim 7, wherein during the second period of time the base station transmitter does not transmit into the first frequency band.

9. The apparatus of claim 7, wherein said circuitry is further configured to cause said base station transmitter to:
   transmit a beacon signal into the second frequency band is also for causing the base station transmitter to transmit a beacon signal into a third frequency band during a third period of time that is shorter than the first period of time; and
   wherein said base station transmitter does not transmit into either of said first and second frequency bands during said third period of time.

10. The apparatus of claim 9,
    wherein said base station transmitter is a sector transmitter of a base station; and
    wherein said ordinary signaling includes user data.

11. The apparatus of claim 10,
    wherein the first, second and third periods of time repeat at a fixed periodicity;
    wherein said sector transmitter does not transmit user data into said second and third frequency bands.

12. The apparatus of claim 10, wherein said sector transmitter is located adjacent second and third base station sectors which use said second and third frequency bands, respectively, to communicate user data.

13. A method, comprising:
    transmitting, from a base station transmitter, ordinary signaling into a first frequency band during a first period of time, wherein the base station transmitter does not transmit into a second frequency band during the first period of time; and
    transmitting, from the base station transmitter, a beacon signal into the second frequency band during a second period of time that is shorter than the first period of time, wherein the beacon signal is transmitted at higher power than the ordinary signaling;

wherein the first and second periods of time repeat at a fixed periodicity.

14. The method of claim 13, wherein the base station transmitter does not transmit into the first frequency band during the second period of time.

15. The method of claim 13, further comprising:
transmitting, from the base station transmitter, a beacon signal into the second frequency band is also for causing the base station transmitter to transmit a beacon signal into a third frequency band during a third period of time that is shorter than the first period of time; and
wherein said base station transmitter does not transmit into either of said first and second frequency bands during said third period of time.

16. The method of claim 15,
wherein said base station transmitter is a sector transmitter of a base station; and
wherein said ordinary signaling includes user data.

17. The method of claim 16,
wherein the first, second and third periods of time repeat at a fixed periodicity;
wherein said sector transmitter does not transmit user data into said second and third frequency bands.

18. The method of claim 16, wherein said sector transmitter is located adjacent second and third base station sectors which use said second and third frequency bands, respectively, to communicate user data.

19. A computer-program product comprising a non-transitory computer readable medium having instructions thereon, the instructions comprising:
code for causing a base station transmitter to transmit ordinary signaling into a first frequency band during a first period of time, wherein the base station transmitter does not transmit into a second frequency band during the first period of time; and
code for causing the base station transmitter to transmit a beacon signal into the second frequency band during a second period of time that is shorter than the first period of time, wherein the beacon signal is transmitted at higher power than the ordinary signaling;
wherein the first and second periods of time repeat at a fixed periodicity.

20. The computer-program product of claim 19, wherein the base station transmitter does not transmit into the first frequency band during the second period of time.

21. The computer-program product of claim 19, wherein the instructions further comprise:
code for causing the base station transmitter to transmit a beacon signal into the second frequency band is also for causing the base station transmitter to transmit a beacon signal into a third frequency band during a third period of time that is shorter than the first period of time; and
wherein said base station transmitter does not transmit into either of said first and second frequency bands during said third period of time.

22. The computer-program product of claim 21,
wherein said base station transmitter is a sector transmitter of a base station; and
wherein said ordinary signaling includes user data.

23. The computer-program product of claim 22,
wherein the first, second and third periods of time repeat at a fixed periodicity;
wherein said sector transmitter does not transmit user data into said second and third frequency bands.

24. The apparatus of claim 23, wherein said sector transmitter is located adjacent second and third base station sectors which use said second and third frequency bands, respectively, to communicate user data.

* * * * *